United States Patent
Lee et al.

(10) Patent No.: US 11,119,717 B2
(45) Date of Patent: Sep. 14, 2021

(54) DIGITAL SIGNAGE SYSTEM AND DATA PROCESSING METHOD IN THE SAME

(71) Applicant: LG ELECTRONICS INC., Seoul (KR)

(72) Inventors: Sangmin Lee, Seoul (KR); Jiwoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 172 days.

(21) Appl. No.: 15/792,172

(22) Filed: Oct. 24, 2017

(65) Prior Publication Data
US 2018/0173485 A1 Jun. 21, 2018

(30) Foreign Application Priority Data
Dec. 20, 2016 (KR) .................. 10-2016-0174402

(51) Int. Cl.
*G06F 3/14* (2006.01)
*G09G 3/3208* (2016.01)
*G09F 15/00* (2006.01)
*G09F 9/30* (2006.01)
(Continued)

(52) U.S. Cl.
CPC .............. *G06F 3/1446* (2013.01); *G09F 9/30* (2013.01); *G09F 9/3026* (2013.01); *G09F 15/0006* (2013.01); *G09G 3/003* (2013.01); *G09G 3/3208* (2013.01); *G09G 2300/023* (2013.01); *G09G 2300/026* (2013.01); *G09G 2320/0626* (2013.01); *G09G 2340/0407* (2013.01); *G09G 2340/0492* (2013.01); *G09G 2356/00* (2013.01); *G09G 2360/04* (2013.01); *G09G 2370/022* (2013.01); *G09G 2380/06* (2013.01)

(58) Field of Classification Search
None
See application file for complete search history.

(56) References Cited

U.S. PATENT DOCUMENTS

| | | | | |
|---|---|---|---|---|
| 2011/0084893 A1* | 4/2011 | Lee | ....................... | G06F 1/1649 345/6 |
| 2012/0270649 A1* | 10/2012 | Griswold | ............. | H04N 13/302 463/31 |

(Continued)

FOREIGN PATENT DOCUMENTS

| | | |
|---|---|---|
| CN | 105872520 A | 8/2016 |
| EP | 2309768 A2 | 4/2011 |

(Continued)

*Primary Examiner* — Andre L Matthews
(74) *Attorney, Agent, or Firm* — Birch, Stewart, Kolasch & Birch, LLP

(57) ABSTRACT

A digital signage system and a data processing method in the same are disclosed. The digital signage system comprises a plurality of display devices displaying a signage content; and a server including a communication unit for transmitting signage content data to each display device, a sensor unit for sensing movement of the plurality of display devices, and a controller for controlling the display devices of which display areas are overlapped, differently from each other on the basis of the sensed movement data of the display devices, if display areas of at least two of the plurality of display devices are overlapped with each other at a predetermined threshold value or more.

5 Claims, 36 Drawing Sheets

(51) Int. Cl.
  *G09F 9/302* (2006.01)
  *G09G 3/00* (2006.01)

(56) References Cited

U.S. PATENT DOCUMENTS

| | | | |
|---|---|---|---|
| 2014/0168070 A1* | 6/2014 | Jeong | G06F 3/013 345/156 |
| 2014/0185129 A1* | 7/2014 | Kim | H01L 51/5284 359/296 |
| 2015/0138214 A1* | 5/2015 | Roh | G02B 27/0101 345/520 |
| 2015/0262331 A1* | 9/2015 | Bang | G06F 3/1431 345/1.3 |
| 2016/0132281 A1* | 5/2016 | Yamazaki | G06F 3/1446 345/1.3 |

FOREIGN PATENT DOCUMENTS

| | | |
|---|---|---|
| EP | 2426597 A1 | 3/2012 |
| EP | 2743906 A1 | 6/2014 |

* cited by examiner (a)          (b)          (c)

(a)            (b)            (c)

(a)　　　　　　　　　(b)　　　　　　　　　(c)

FIG. 15
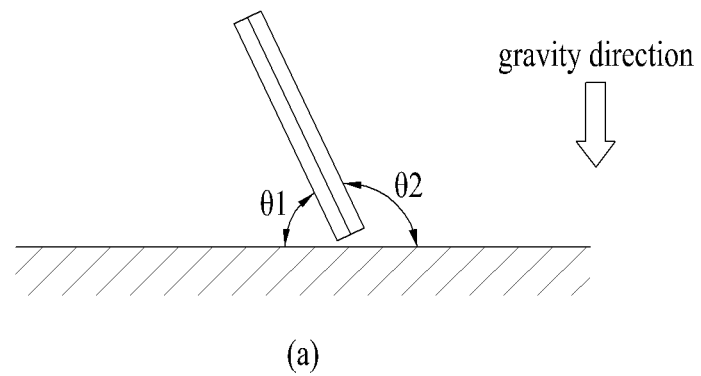
(a)
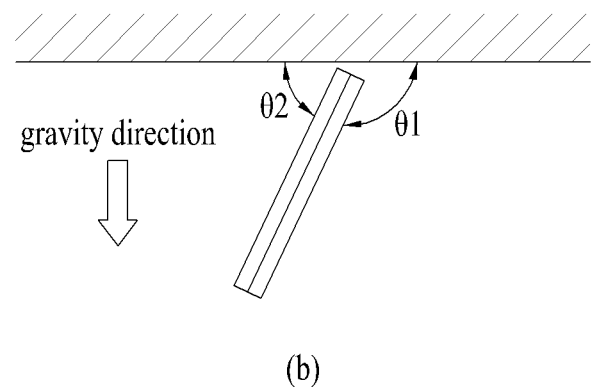
(b)
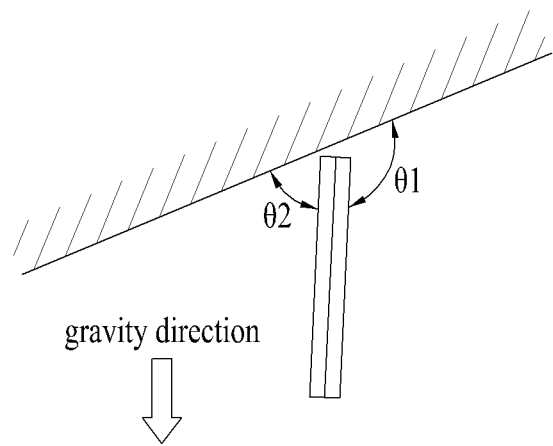
(c)

FIG. 16
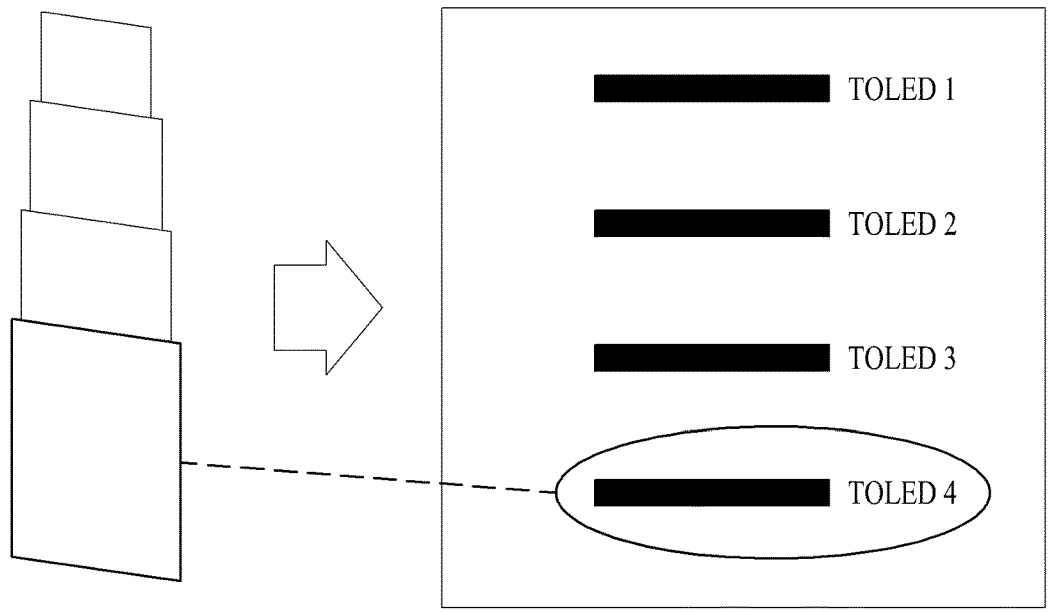
(a)
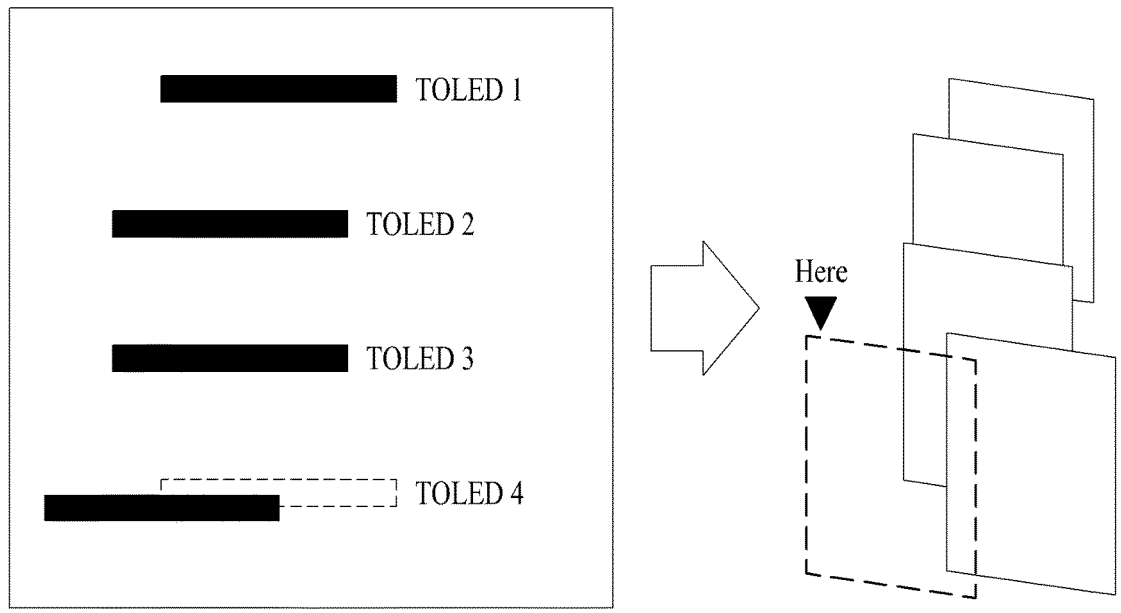
(b)

FIG. 17
(a) 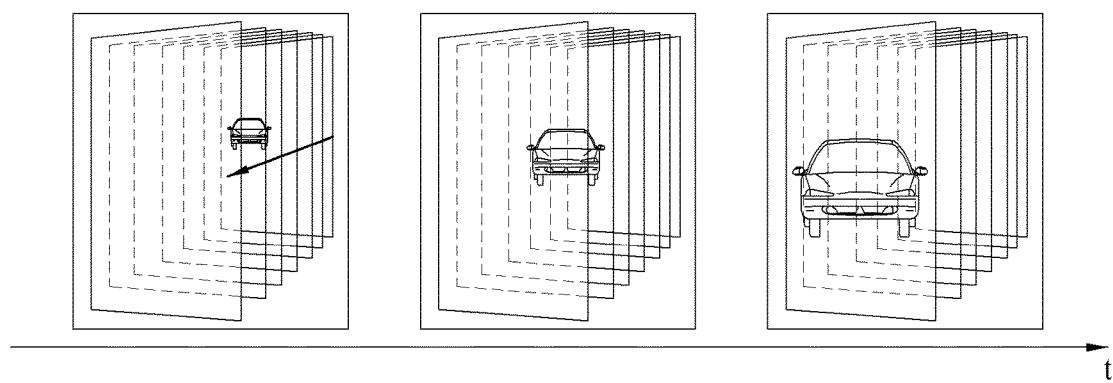
(b) 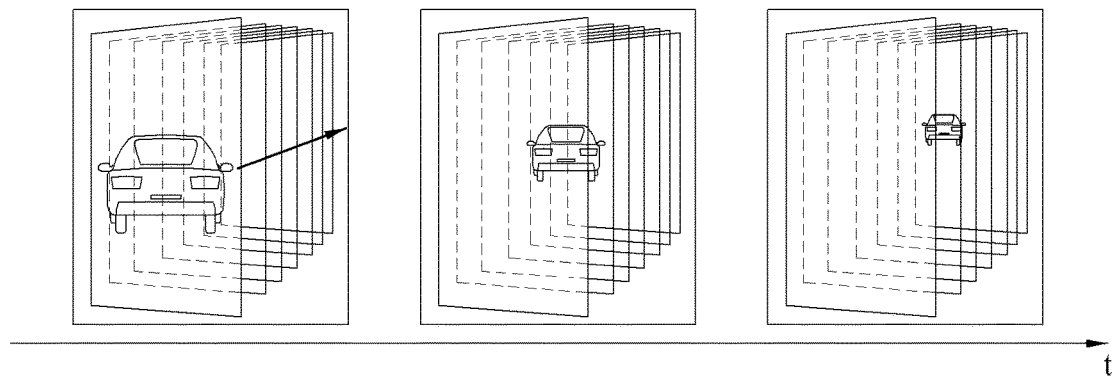

FIG. 21
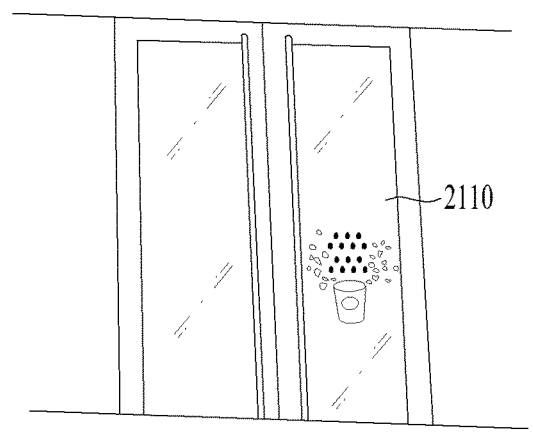
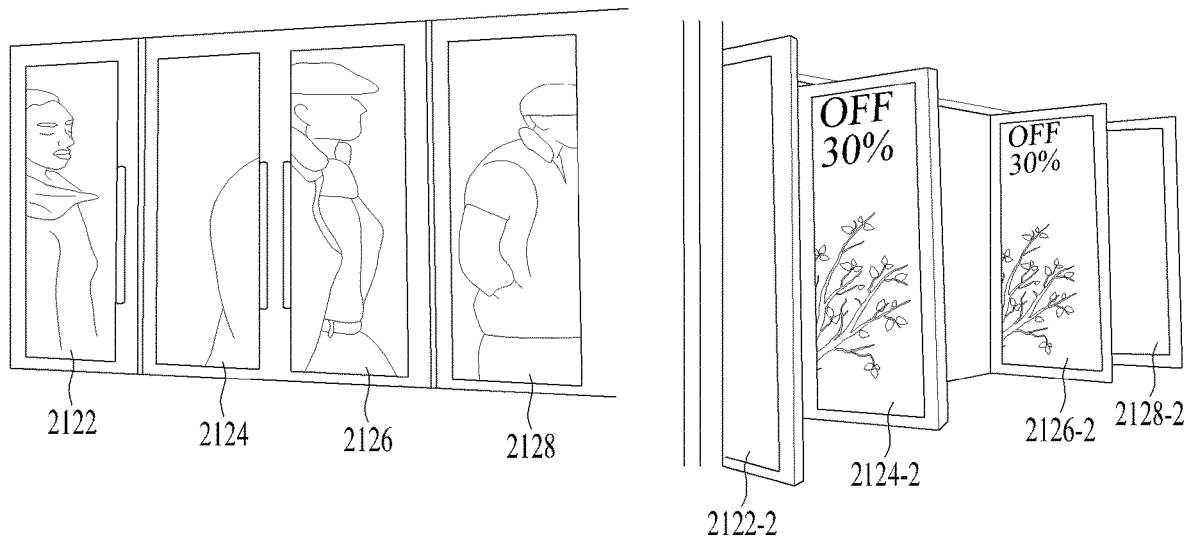

FIG. 24
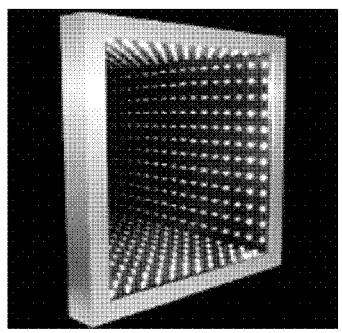 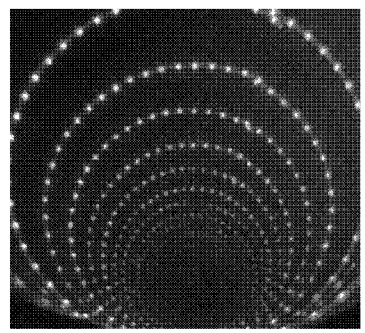 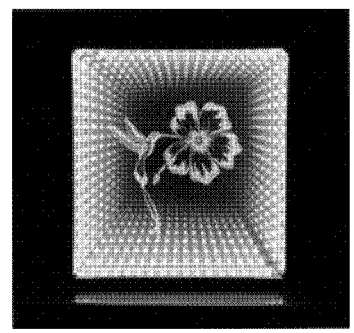
(a)                  (b)                  (c)

FIG. 25
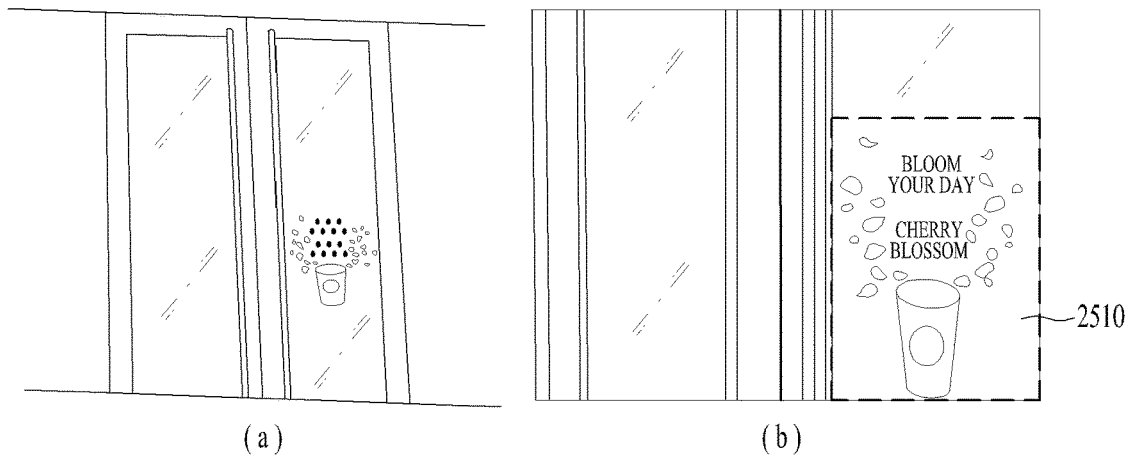
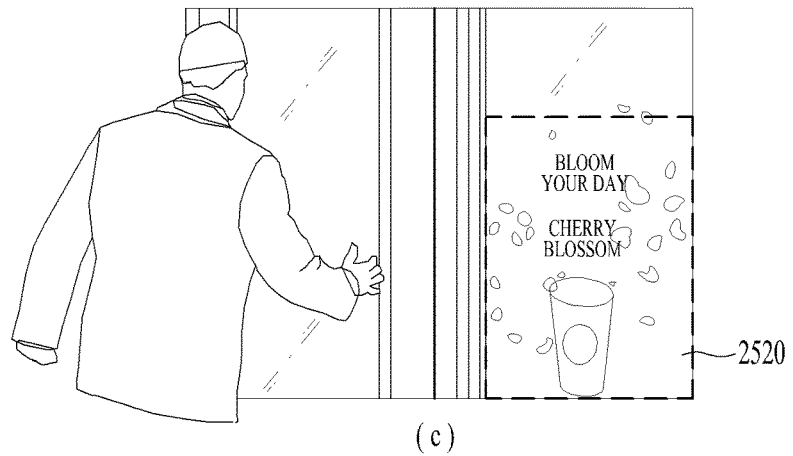
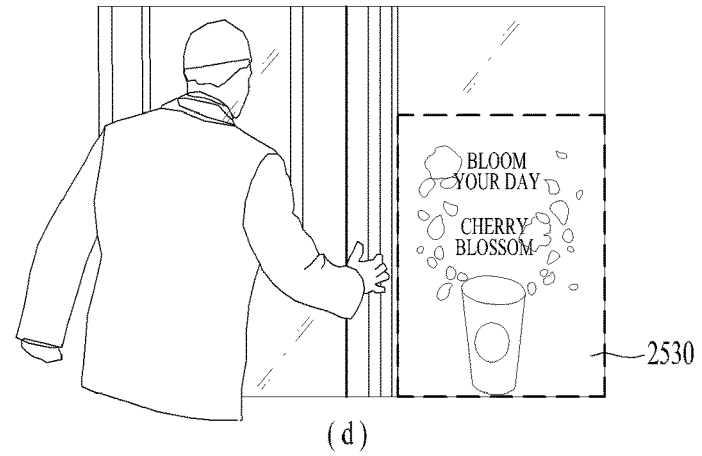

FIG. 26
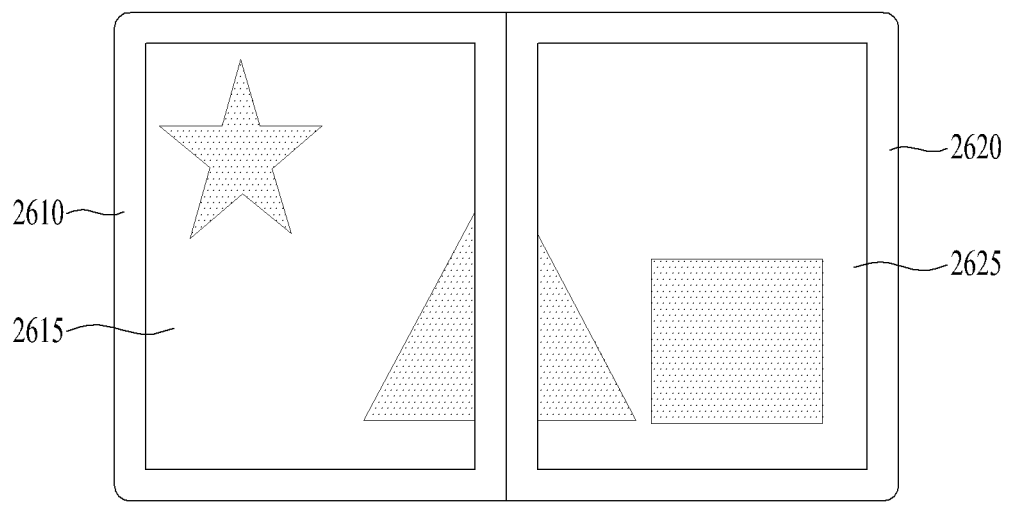
(a)
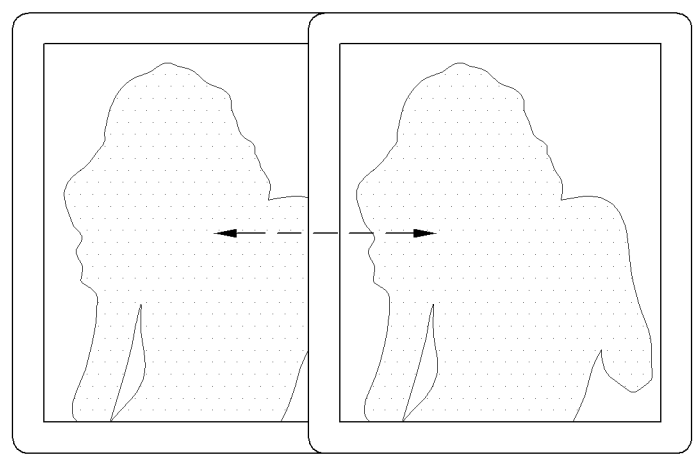
(b)

FIG. 27
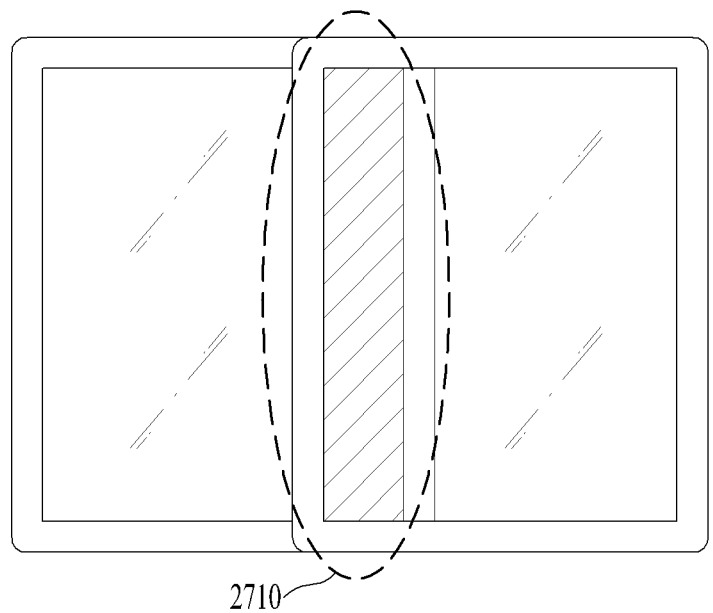
(a)
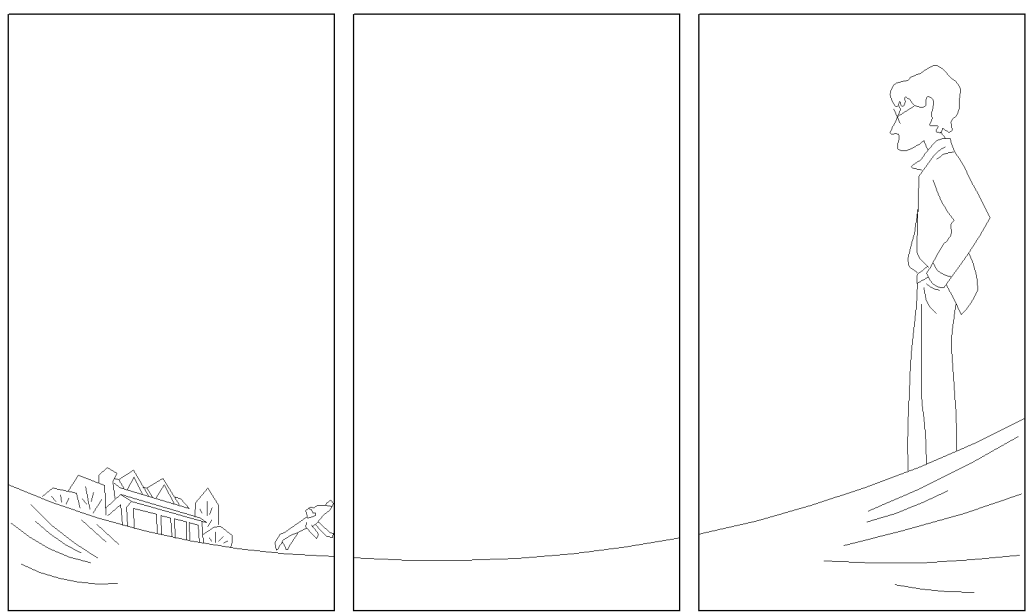
(b)

FIG. 28
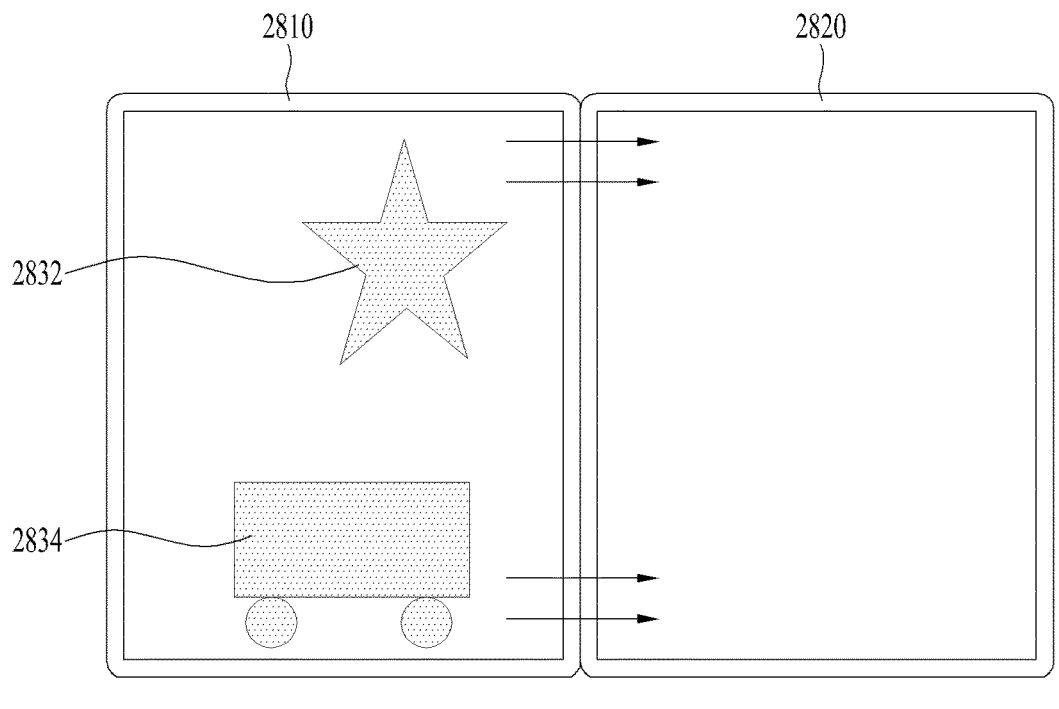
(a)
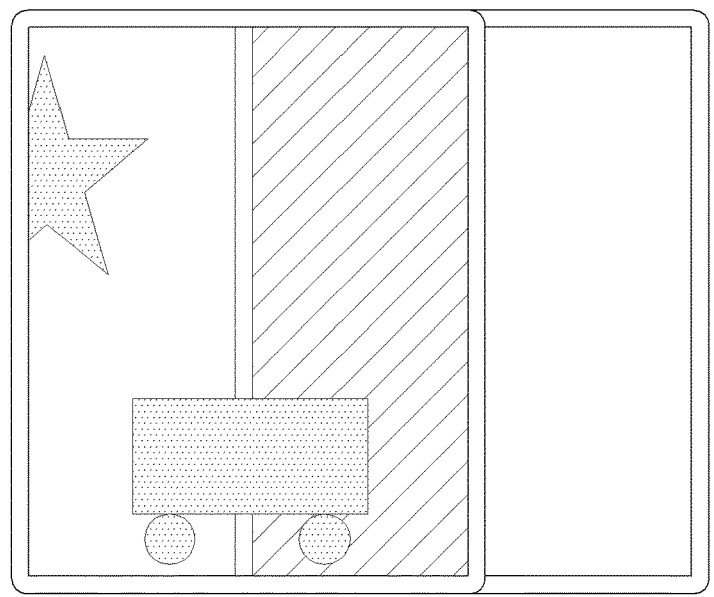
(b)

FIG. 29
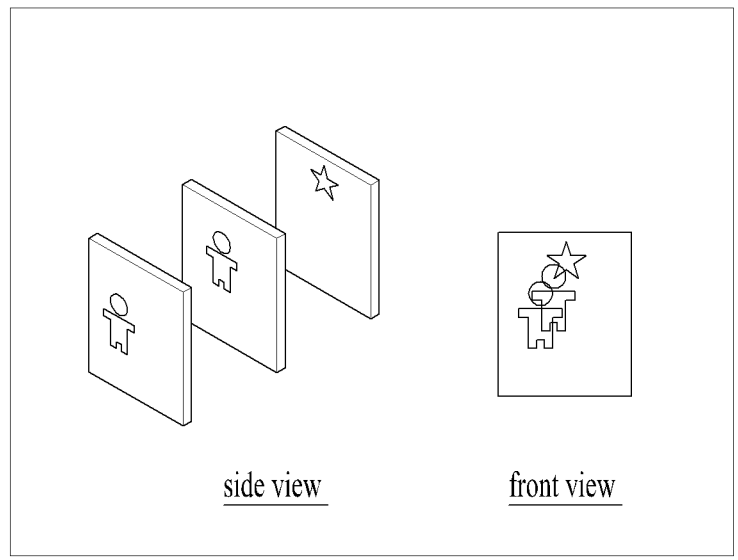
(a)
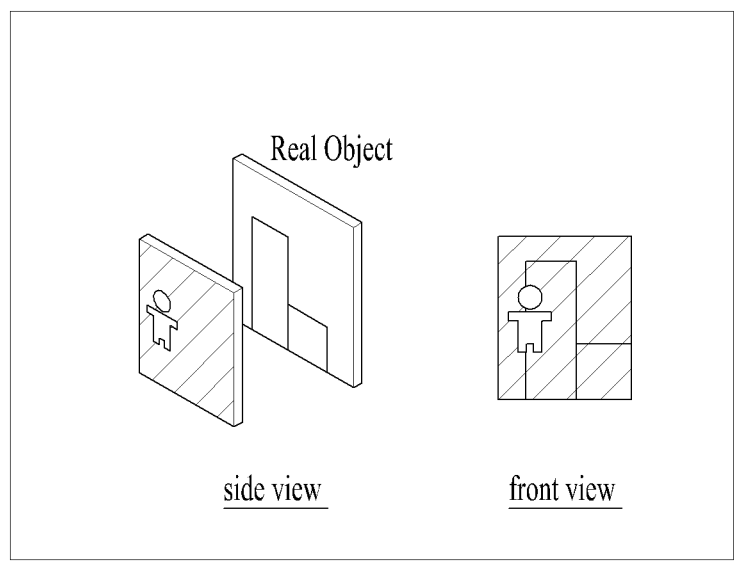
(b)

FIG. 33
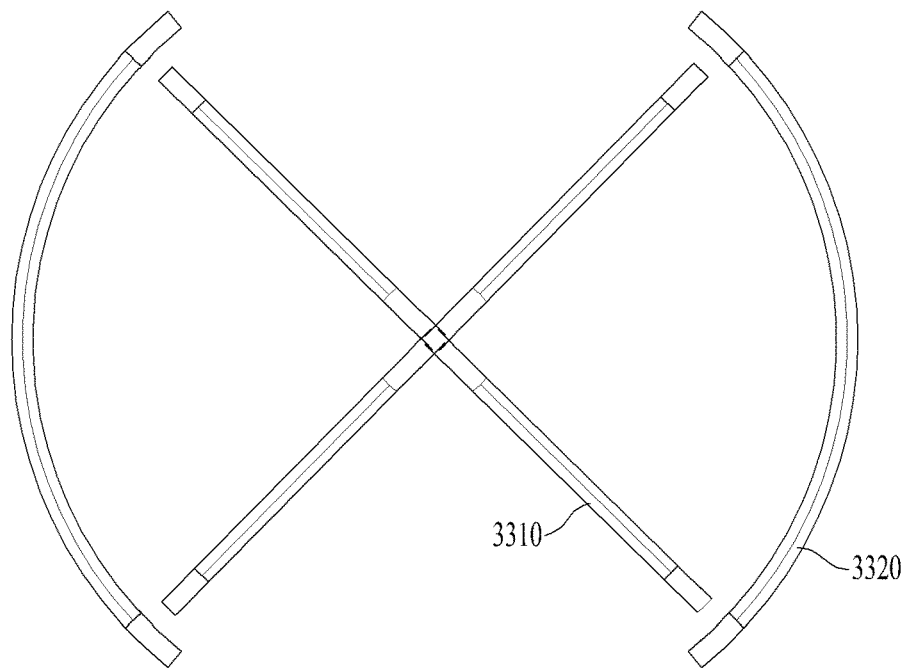
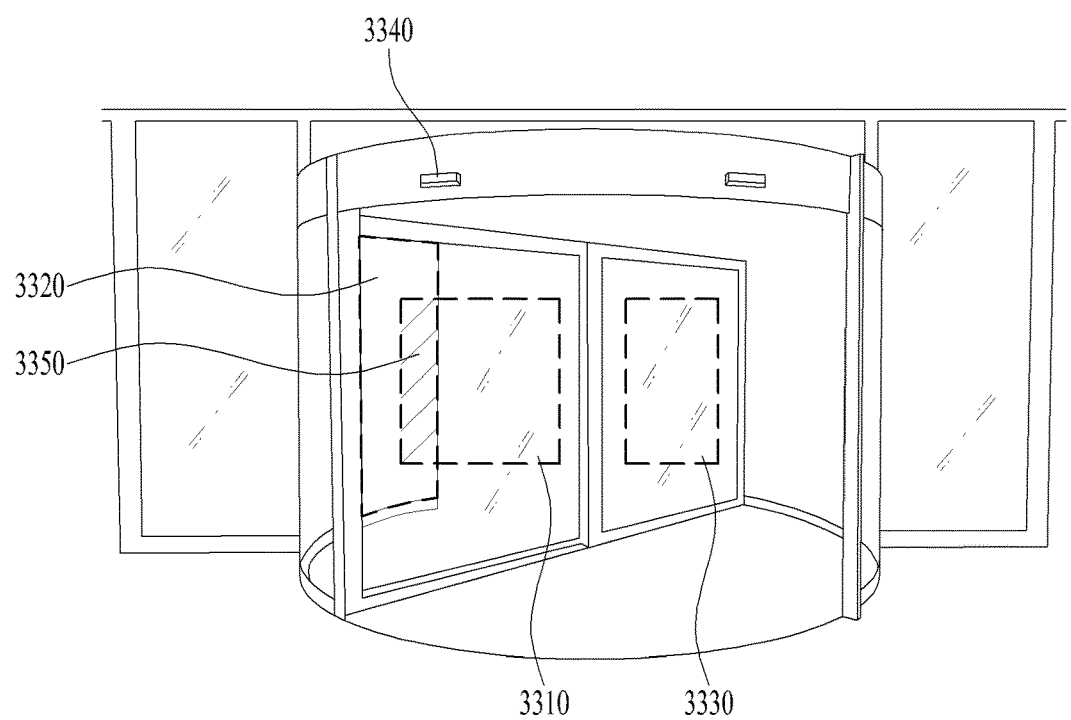

DIGITAL SIGNAGE SYSTEM AND DATA PROCESSING METHOD IN THE SAME

CROSS-REFERENCE TO RELATED APPLICATIONS

Pursuant to 35 U.S.C. § 119(a), this application claims the benefit of earlier filing date and right of priority to Korean Application No. 10-2016-0174402, filed on Dec. 20, 2016, the contents of which are hereby incorporated by reference herein in their entirety.

BACKGROUND OF THE INVENTION

Field of the Invention

The present invention relates to a digital signage system, and more particularly, to a digital signage system configured by digital signages including a plurality of display devices having a transparent display and a data processing method in the same.

Discussion of the Related Art

With the development of the information age, a demand for a display device has been increased in various forms. Therefore, various display devices such as LCD (Liquid Crystal Display) device, PDP (Plasma Display Panel), ELD (Electro Luminescent Display), VFD (Vacuum Fluorescent Display), and OLED (Organic Light Emitting Diode) have been studied and used. The display devices may be used in various fields such as TV, mobile device, etc. Particularly, the display devices may recently be used as digital signage.

However, a digital signage system of the related art outputs a signage content onto a digital signage under the control of a server. At this time, even though the digital signage is configured by only one display device or a plurality of display devices, each display device is horizontally and simply listed to display the signage content two-dimensionally. However, at the time when an available area of the digital signage is gradually increased, this scheme for providing information two-dimensionally through the digital signage has a problem in that the digital signage has a limitation and its applicability is reduced.

SUMMARY OF THE INVENTION

Accordingly, the present invention is to address the above-noted and other problems. An object of the present invention is to provide a digital signage system that provides a stereoscopic signage content having depth and the immersion level unlike the related art digital signage system that only provides two-dimensional signage information.

Another object of the present invention is to actively control a digital signage by controlling a signage content in response to various events such as movement of display devices.

Other object of the present invention is to maximize an effect of a digital signage by implementing a digital signage system as above.

The technical objects that can be achieved through the present invention are not limited to what has been particularly described hereinabove and other technical objects not described herein will be more clearly understood by persons skilled in the art from the following detailed description.

This specification discloses a digital signage system and a data processing method in the same.

To achieve these objects and other advantages and in accordance with the purpose of the specification, as embodied and broadly described herein, a digital signage system according to one embodiment of the present invention comprises a plurality of display devices displaying a signage content; and a server including a communication unit for transmitting signage content data to each display device, a sensor unit for sensing movement of the plurality of display devices, and a controller for controlling the display devices of which display areas are overlapped, differently from each other on the basis of the sensed movement data of the display devices, if display areas of at least two of the plurality of display devices are overlapped with each other at a predetermined threshold value or more.

In another aspect of the present invention, a digital signage system according to another embodiment of the present invention comprises a plurality of display devices of which display areas are arranged to be overlapped, only a first display device of the plurality of display devices displaying an image in a first mode; and a server including a sensor unit, a communication unit for transmitting image data to at least one of the display devices, and a controller for controlling an image data display time of each display device to allow an image data display time interval of each display device to reach a value less than a predetermined threshold value if the first mode is changed to a second mode as a result of sensing of the sensor unit.

The above technical solutions are merely some parts of the embodiments of the present invention and various embodiments into which the technical features of the present invention are incorporated can be derived and understood by persons skilled in the art from the following detailed description of the present invention.

According to the present invention, the following advantageous effects can be obtained.

According to at least one of the embodiments of the present invention, a digital signage system that provides a stereoscopic signage content having depth and the immersion level may be provided unlike the related art digital signage system that only provides two-dimensional signage information.

According to at least one of the embodiments of the present invention, it is possible to actively control a digital signage by controlling a signage content in response to various events such as movement of display devices.

According to at least one of the embodiments of the present invention, it is possible to maximize an effect of a digital signage by implementing a digital signage system as above.

The effects that can be achieved through the present invention are not limited to what has been particularly described hereinabove and other effects not described herein will be more clearly understood by persons skilled in the art from the following detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 13 to 16 are views illustrating a method for controlling a display device according to events of a digital signage system in accordance with one embodiment of the present invention;

FIG. 17 is a view illustrating an effect of apparent movement through display devices of a digital signage system according to one embodiment of the present invention;

FIG. 21 is a view illustrating an example of a method for implementing a digital signage according to the present invention;

FIGS. 22 to 24 are views illustrating configurations of a digital signage and a display device;

FIG. 25 is a view illustrating a digital signage implemented in accordance with one embodiment of the present invention;

FIG. 26 is a view illustrating a digital signage implemented in a store sliding door according to one embodiment of the present invention;

FIGS. 27 to 31 are views illustrating a method for providing a signage content in store sliding doors in accordance with one embodiment of the present invention;

FIG. 33 is a view illustrating a digital signage system implemented in a revolving door in accordance with one embodiment of the present invention;

DETAILED DESCRIPTION OF THE PREFERRED EMBODIMENTS

Figure 1:
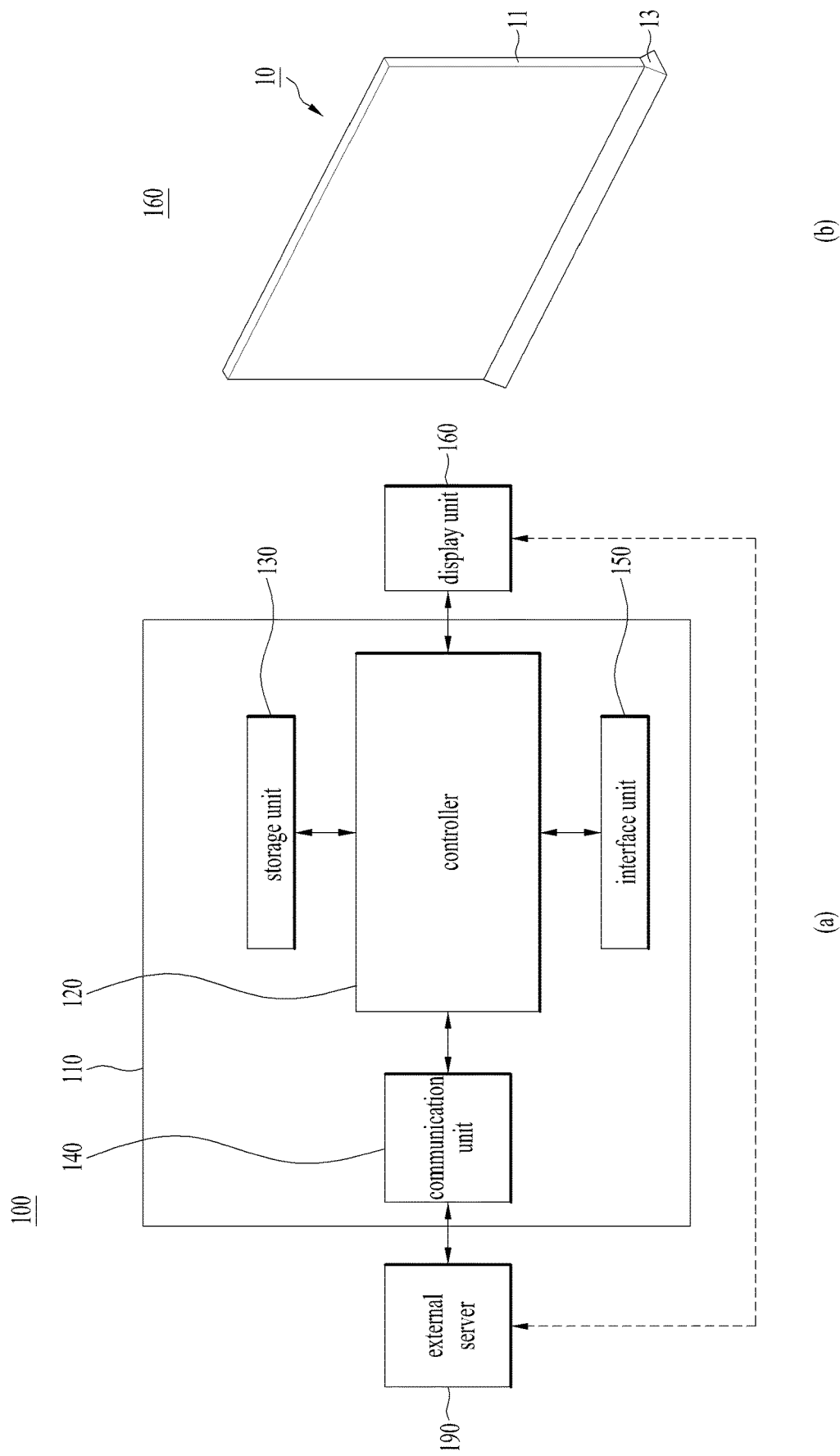
FIG. 1 is a view illustrating a digital signage system configured in accordance with one embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. The suffixes "module" and "unit" for the elements used in the following description are given or used in common by considering facilitation in writing this disclosure only but fail to have meanings or roles discriminated from each other.

Also, in description of the embodiments disclosed in this specification, if detailed description of the disclosure known in respect of the present invention is determined to make the subject matter of the embodiments disclosed in this specification obscure, the detailed description will be omitted. Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present invention.

Although the terms such as "first" and/or "second" in this specification may be used to describe various elements, it is to be understood that the elements are not limited by such terms. The terms may be used to identify one element from another element.

The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to another element" means that no third element exists therebetween.

It is to be understood that the singular expression used in this specification includes the plural expression unless defined differently on the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

A digital signage system described in this specification may include an indoor signboard, a digital video output device, a digital video display device, a digital TV, a desktop computer, etc.

However, it will easily be apparent to those skilled in the art that the elements according to the embodiment disclosed in this specification may be applied to mobile terminals such as a cellular phone, a smart phone, a laptop computer, a digital broadcast terminal, a PDA (personal digital assistants), a PMP (portable multimedia player), a navigator, a slate PC, a tablet PC, an ultrabook, and a wearable device (for example, watch type terminal (smart watch), smart glasses, HMD (head mounted display)), except for the case applicable to digital signage only.

Hereinafter, in this specification, a digital signage system and a data processing method in the digital signage system according to the present invention will be described with reference to the accompanying drawings.

FIG. 1 is a view illustrating a digital signage system configured in accordance with one embodiment of the present invention. In this case, FIG. 1a is a functional block diagram illustrating a digital signage system according to one embodiment of the present invention, and FIG. 1b briefly illustrates a display in a digital signage system according to one embodiment of the present invention.

The digital signage system 100 according to the present invention comprises a server 110 and a display unit 160.

In this case, the display unit 160 in the digital signage system may include at least two or more display units or a plurality of display units, wherein the respective display units do not need to have the same type or attribute.

Meanwhile, the other component module except the display unit 160 in the digital signage system, that is, the server 110 may be implemented as one device depending on the system. Meanwhile, the digital signage system may further comprise an external server 190 depending on the system.

Some component modules may be added to or modified in the digital signage system shown in FIG. 1a, and the scope of the present invention should not be determined by elements disclosed in the drawings but be construed in accordance with the disclosure cited in claims.

The server 110 of the digital signage system may include a controller 120, a storage unit 130, a communication unit 140, a camera unit (not shown), and an interface unit 150.

The communication unit 140 may receive a signage content not the signage content self-manufactured or previously stored from the external server 190 through a network. At this time, the signage content may be in the form of service, application, media data, image, etc. The communication unit 140 may be implemented as at least one of a tuner, a network interface unit, and a wireless communication unit. Meanwhile, the communication unit 140 may deliver a predetermined signage content to the display device under the control of the controller 120 or provide an interface environment for the predetermined signage content.

The interface unit 150 may receive a specific command from a user. The interface unit 150 may receive a control signal for controlling the digital signage system 100 from a remote controller, or may receive a control signal for controlling the digital signage system 100 through a touch screen if the display unit 160 includes the touch screen. Also, the interface unit 150 may be connected with a user input unit to receive a specific signal transmitted from the user input unit. Also, the interface unit 150 may be connected with an external device to transmit or receive data to or from the external device.

The storage unit 130 may store various programs, applications, algorithms, content production tools, which are required for an operation of the digital signage system 100. The storage unit 130 may store a signage content received through the communication unit 140.

The controller 120 controls the operation of the digital signage system 100, and manages and controls the overall digital signage system 100 such as the display unit 160, the storage unit 130, the communication unit 140, the camera unit (not shown) and the interface unit 150. The controller 120 may include a decoder for processing video data and audio data of the signage content received through the communication unit 140.

The camera unit (not shown) may be included in the digital signage system 100. The digital signage system 100 may acquire at least one of image and video through the camera unit.

The display unit 160 may display video, graphic, image, etc., which correspond to the signage content received through the communication unit 140. Alternatively, the display unit 160 may display a signage content (for example, video data, graphic data, image data, etc.) previously stored in the storage unit 130. The display unit 160 may be implemented as a touch screen and thus may be used as an input unit in addition to an output unit.

Meanwhile, at least one of the display units of the digital signage system according to the present invention may be a transparent display as shown in FIG. 1b.

Referring to FIG. 1b, the transparent display unit 10 includes a transparent display 11 and its stand 13.

The transparent display 11 is a display for displaying information while transmitting light, whereby an image beyond the display is seen. Examples of the transparent display 11 may include a Thin Film Electroluminescent Display and an OLED (Organic Light Emitting Diode). The Thin Film Electroluminescent Display and the OLED (Organic Light Emitting Diode may be driven in a passive matrix manner. Since they do not need a TFT, they are manufactured as a transparent light emitting diode and a transparent electrode, whereby the entire display may be transparent. Also, a display, which uses a TFT, like an active matrix OLED, may be made transparently by manufacturing a TFT using a transparent material such as a multi-component oxide semiconductor. Also, the transparent display 11 may be a plasma display panel manufactured of an electrode and a dielectric layer, each of which is made of a transparent material, and a barrier made of a glass composition. In addition to the above examples, the transparent display applied to this embodiment may include all kinds of displays that transmit light while information is being displayed and even while information is not being displayed.

The stand 13 is fixed in such a manner that the transparent display 11 stands on the floor. The stand 13 may be implemented in various types. For convenience, FIG. 1b illustrates that the stand 13 is supported in a state that the transparent display 11 stands on the floor. Various hardware components required for driving of the transparent display 11 may be installed in the stand 13. For example, a power unit for supplying a power to the transparent display 11 and a driving board for making signals required to drive the transparent display 11 may be installed in the stand 13.

For another example, a hardware component required for driving of the transparent display 11 may be configured separately to be spaced apart from the transparent display 11. In this case, the transparent display 11 may be fixed to a glass wall or stands on the floor.

For other example, the stand 13 is supported in such a manner that it stands on the floor, and may include a moving means such as wheel and rail therebelow, whereby the stand 13 may be used during spatial interval adjustment between the display units in accordance with the present invention.

For convenience of description of a corresponding portion in this specification, terms such as broadcast signal, service and application may be used, and each of these terms may be an example of the signage content related to the present invention.

Figure 2:
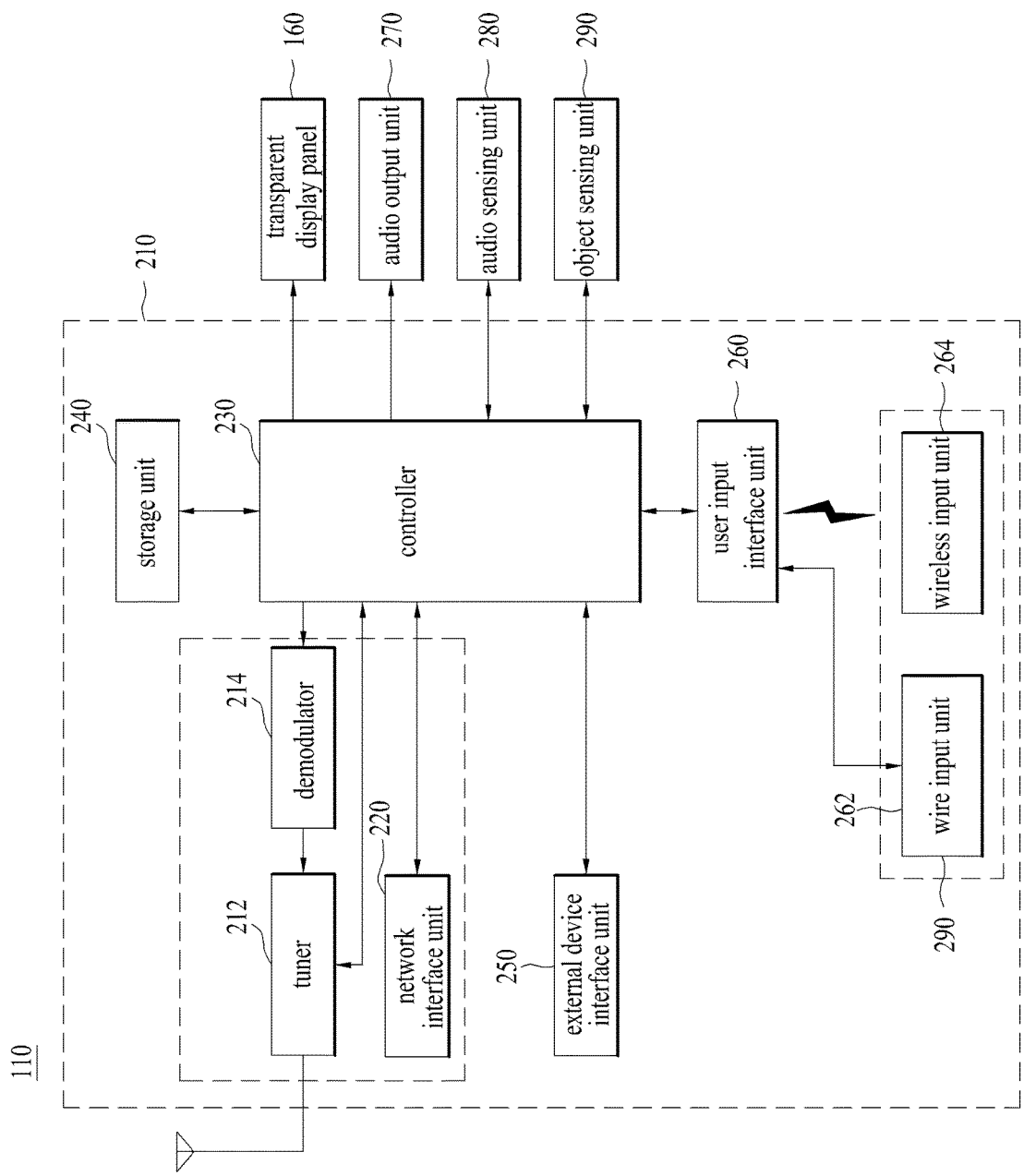
FIG. 2 is a block diagram illustrating a server according to one embodiment of the present invention.

FIG. 2 is a block diagram illustrating a server according to one embodiment of the present invention.

Figure 3:
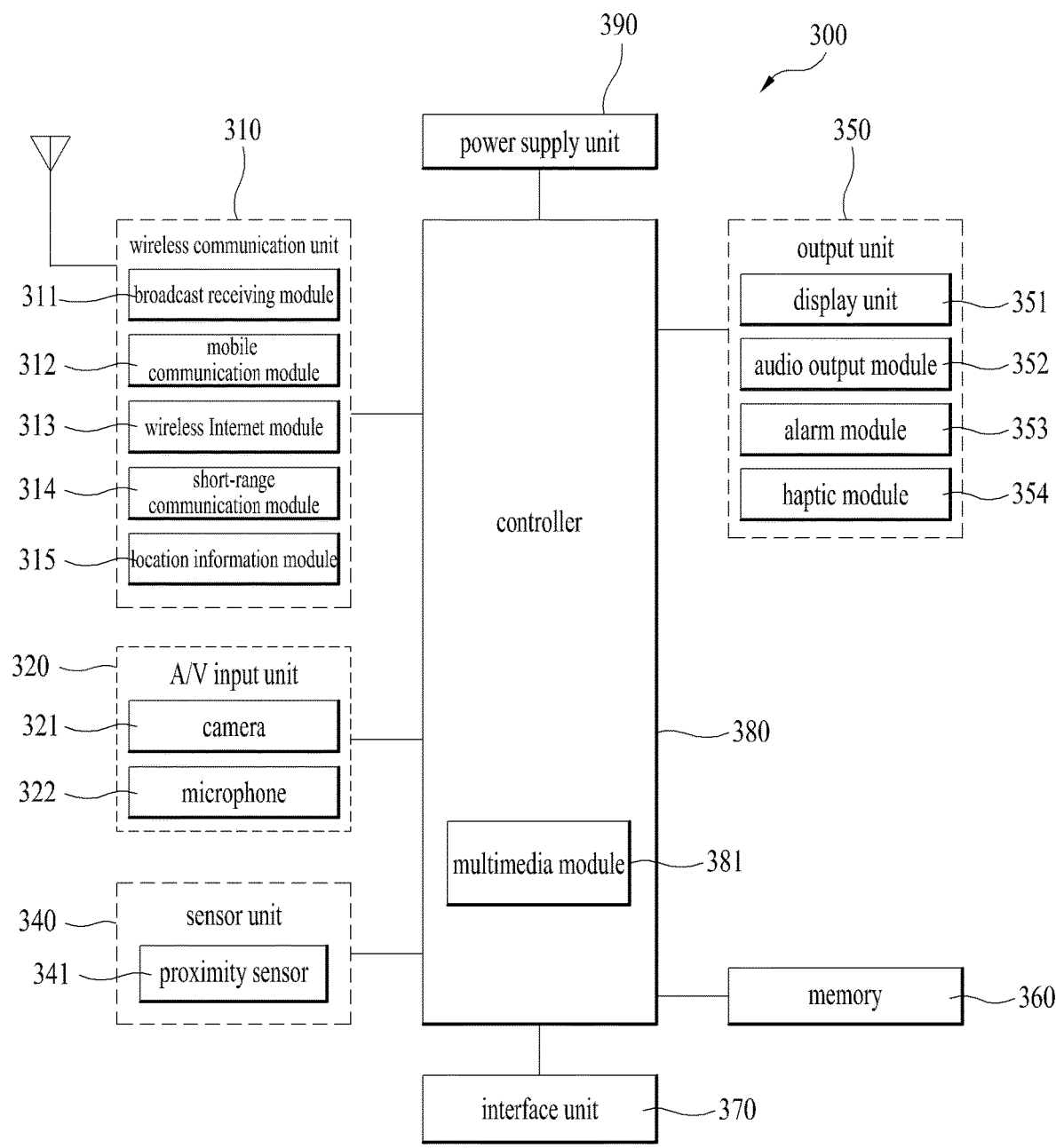
FIG. 3 is a block diagram illustrating a server according to another embodiment of the present invention.

In this specification, as a server or system controller (hereinafter, server 110), a digital TV is illustrated in FIG. 2 while a mobile terminal is illustrated in FIG. 3.

In addition, the server 110 may be implemented as various processors such as PC, notebook computer, etc. Meanwhile, among a plurality of display devices, a display device for initially displaying a signage content may not be a transparent display. At this time, the display device may also be the same component as that of FIG. 2 or 3. In this case, the server 110 may be replaced with the display device.

The server 110 is an intelligent video display device that additionally provides a computer support function in addition to a broadcast receiving function. As the server 110 is additionally provided with an Internet function while performing a broadcast receiving function, the server 110 may be provided with an interface convenient for use, such as a manual type input device, a touch screen, a spatial remote controller.

Moreover, the server 110 may be connected to Internet and computer in accordance with the support of wire or wireless Internet function to perform functions such as e-mailing, web browsing, banking, games, etc. A standardized operating system (OS), Web OS, etc. may be used for such various functions.

Therefore, since the server 110 may freely be provided with or delete various applications on a general-purpose OS kernel, the server 110 may perform user-friendly various functions. For example, the server 110 may include a mobile terminal such as a network TV, an HBBTV, a smart TV, and a smart phone.

Referring to FIG. 2, the server 110 may include a display unit 160 for displaying an image, and a driving unit 210 for supplying a driving signal to the display unit 160.

If the server 110 receives a broadcast signal, the server may include a driving unit 210 for supplying a driving signal to the display unit 160 in response to the received broadcast signal.

Alternatively, even though the server 110 does not receive a broadcast signal, the driving unit 210 may supply a driving signal for image display to the display unit 160.

The driving unit 210 may control image display and audio output of the server 110. The driving unit 210 may include a receiving unit, an external device interface unit 250, a storage unit 240, a user input interface unit 260, a controller 230, and a command input unit.

The driving unit 210 and the display unit 160 may be formed in a single body.

Alternatively, the driving unit 210 and the display unit 160 may be modularized separately, and may perform communication with each other through a wire or wireless manner.

Also, the server 110 may include a voice output unit 270 for outputting a voice, an audio sensing unit 280 for sensing a voice, and an object sensing unit 290 for sensing a user's motion, position, face, etc., taking an image or photo of a predetermined object, or acquiring information of a predetermined object.

The server 110 will now be described in more detail.

The receiving unit may include a tuner 212, a demodulator 214, and a network interface unit 220. In accordance with the system, the receiving unit may be designed so as not to include the network interface unit 220 while including the tuner 212 and the demodulator 214. On the contrary, the receiving unit may be designed so as not to include the tuner 212 and the demodulator 114 while including the network interface unit 220.

The tuner 212 selects a radio frequency (RF) broadcast signal corresponding to a channel selected by a user from among RF broadcast signals received through an antenna or all previously stored channels. Also, the tuner 212 converts the received RF broadcast signal to a digital intermediate frequency (IF) signal or a baseband video or audio signal.

The demodulator 214 may perform demodulation by receiving the digital IF (DIF) signal converted by the tuner 212.

The demodulator 214 may perform demodulation and channel decoding and then output a Transport Stream (TS) signal. At this time, the TS signal may be a signal in which a video signal, an audio signal and a data signal are multiplexed.

The TS signal output from the demodulator 214 may be input to the controller 230.

The controller 230 performs demultiplexing, video/audio signal processing and/or the like and then outputs a video to the display unit 160, and outputs an audio to the audio output unit 270.

The external device interface unit 250 may connect an external device with the server 110 according to the present invention. To this end, the external device interface unit 250 may include an A/V input/output unit (not shown) or a wireless communication unit (not shown).

The external device interface unit 250 may be connected with external devices such as a digital versatile disk (DVD), a Blu-ray player, a game device, a camcorder, and a computer (notebook computer) in a wired/wireless manner. The external device interface unit 250 may deliver a video, audio, or data signal input through a connected external device to the controller 230 of the server 110. Also, the external device interface unit 250 may output the video, audio or data signal processed by the controller 230 to the connected external device.

The network interface unit 220 may provide an interface for connecting the server 110 with a wire/wireless network including Internet network.

The network interface unit 220 may transmit or receive data to or from other user or other electronic device through a connected network or other network linked with the connected network.

Meanwhile, the network interface unit 220 may be connected to a predetermined web page through a connected network or other network linked with the connected network. That is, the network interface unit 220 may be connected to a predetermined web page through a network to transmit or receive data to or from a corresponding server. In addition, the network interface unit 220 may receive content or data provided by a content provider or a network manager. That is, the network interface unit 220 may receive content such as movies, advertisements, games, VOD, or broadcast signals and information associated with the content, which are provided by the content provider or the network provider over a network. The network interface unit 220 may also receive update information and update files of firmware provided by the network manager. The network interface unit 220 may transmit data to the Internet or content provider or the network manager.

The storage unit 240 may store programs for signal processing and control within the controller 230 and store the processed video, audio or data signal.

In addition, the storage unit 240 may execute a function of temporarily storing the video, audio or data signal input from the external device interface unit 250 or the network interface unit 220. Also, the storage unit 240 may store information on a predetermined broadcast channel through a channel memory function.

The storage unit 220 may include at least one of a flash memory type, a hard disk type, a multimedia card micro type, a card type memory (e.g., SD or XD memory), RAM, EEPROM, etc.

The server 110 may reproduce content files (a video file, a still image file, a music file, a text file, an application file, etc.) stored in the storage unit 240 and provide them to the user.

The command input unit may include an input key for allowing a user to input a command. The command input unit may include a wire input unit 262 for inputting a command in a wire manner, and a wireless input unit 264 for inputting a command in a wireless manner.

The command input unit is able to input various commands such as power on/off, channel selection, screen setup, volume control, cursor movement on the screen, and menu selection.

In this case, the wireless input unit 264 may be a remote controller for remote control. The user input interface unit 260 may deliver the signal input by the user through the command input unit to the controller 230, or may deliver the signal from the controller 230 to the command input unit.

If the user inputs a predetermined command through the wire input unit 262, the input command may directly be delivered to the controller without through the user input interface unit 260.

The user input interface unit 260 may receive and process the command input from the wireless input unit 264 or process the control signal from the controller 230 to be transmitted to the wireless input unit 264 in accordance with various communication schemes such as RF communication, IR communication, and the like.

Also, for example, the user input interface unit 260 may transmit control signals input through a power key, a channel key, a volume key, and a local key (not shown) of the command input unit to the controller 230.

The controller 230 may generate and output a signal for video or audio output by demultiplexing streams input through the tuner 212, the demodulator 214 or the external device interface unit 250 or processing the demultiplexed signals.

The video signal processed by the controller 230 may be input to the display unit 160 and displayed as an image corresponding to the corresponding video signal. In addition, the video signal processed by the controller 230 may be input to an external output device through the external device interface unit 250.

The audio signal processed by the controller 230 may be output to the audio output unit 270. Also, the audio signal processed by the controller 230 may be output to an external output device through the external device interface unit 250.

Also, the controller 230 may control the overall operation of the server 110. For example, the controller 230 may control the tuner 212 to tune to an RF broadcast corresponding to a channel selected by the user or a previously stored channel.

Also, the controller 230 may control the server 110 in accordance with a user command input through the user input interface unit 260 or an internal program. Particularly, the controller 230 may control the server 110 to be linked to a network to download an application or application list that the user desires, to the server 110.

For example, the controller 230 controls the tuner 212 to receive a signal of a channel selected in response to a predetermined channel selection command received through the user input interface unit 260. In addition, the controller 230 processes a video, audio or data signal corresponding to the selected channel. The controller 230 may control information on a channel selected by the user to be output with the processed video or audio signal through the display unit 160 or the audio output unit 270.

For another example, the controller 230 controls a video signal or an audio signal received from an external device, for example, a camcorder through the external device interface unit 250 to be output through the display unit 160 or the audio output unit 270 in accordance with an external device image reproduction command received through the user input interface unit 260.

The controller 230 may control the display unit 160 to display images. For example, the controller 230 may control a broadcast image input through the tuner 212, an external input image input through the external device interface unit 250, an image input through the network interface unit 220, or an image stored in the storage unit 240 to be displayed on the display unit 160. At this time, the image displayed on the display unit 160 may be a still image or video, and may be a 2D or 3D image.

The controller 230 may control reproduction of content. At this time, the content may be content stored in the server 110, received broadcast content, or content input from an external device. The content may include at least one of a broadcast image, an external input image, an audio file, a still image, an image of a linked web, and a text file.

Also, the controller 230 searches for user terminals connected with the transparent display unit through the network interface unit 220, outputs a list of the searched user terminals through the display unit 160, and receives a selection signal of the user terminal used as a user controller among the list of the searched user terminals through the user input interface unit 260.

Also, the controller 230 may control the display unit 160 to output player information corresponding to each user terminal.

The display unit 160 converts the video signal, the data signal, or OSD signal processed by the controller 230 or the video signal and the data signal received from the external device interface unit 250 into RGB signals to generate driving signals.

Meanwhile, the display unit 160 may be arranged on a touch screen.

The audio output unit 270 receives a signal audio-processed by the controller 230, for example, a stereo signal, a 3.1 channel signal or a 5.1 channel signal, and outputs the received signal as audio. The audio output unit 270 may be configured as one of various types of speakers.

The audio sensing unit 280 may sense audio generated inside or outside the server 110. The audio sensing unit 280 may include an audio sensor or a microphone.

The object sensing unit 290 may sense a user's motion, position, face, etc. to this end, the object sensing unit 290 may include a sensor unit (not shown) that includes at least one of a touch sensor, an audio sensor, a position sensor, and an action sensor. The signal sensed by the sensor unit may be delivered to the controller 230.

Also, the object sensing unit 290 may include a photographing unit (not shown) such as a camera. Image information photographed by the photographing unit (not shown) may be input to the controller 230.

Alternatively, the object sensing unit 290 may include a sensor unit and a photographing unit together.

The controller 230 may acquire information on a user's gesture, face, and position from an image captured by the photographing unit (not shown) or a signal sensed by the sensing unit (not shown), or by combining the image and the signal.

Also, the object sensing unit 290 may sense information on a user's face type and a user's face direction as well as a user's motion.

FIG. 3 is a block diagram illustrating a server according to another embodiment of the present invention;

Referring to FIG. 3, Server 110 may include a wireless communication unit 310, an A/V (Audio/Video) input unit 320, a user input 330, a sensing unit 340, an output unit 350, a memory 360, an interface unit 370, a controller 380, and a power supply unit 390.

The wireless communication unit 110 may include one or more modules which permit communications such as wireless communications between the mobile terminal 100 and a wireless communication system, communications between the mobile terminal 100 and another mobile terminal, or communications between the mobile terminal 100 and an external server. For example, the wireless communication unit 310 may include at least one of a broadcast receiving module 311, a mobile communication module 312, a wireless Internet module 313, a short-range communication module 314, and a location information module 315.

The broadcast receiving module 311 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 311 may be utilized to facilitate simultaneously receiving of two or more broadcast channels, or to support switching among broadcast channels. The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal. The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 311 can receive the digital broadcast signals using a method appropriate for the transmission method utilized. Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112. The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 311 may be stored in a suitable device, such as a memory 360.

The mobile communication module 312 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 312 include audio call signals, video (telephony) call signals, or various formats of data to support communication of text and multimedia messages.

The wireless Internet module 313 is configured to facilitate wireless Internet access. This module may be internally or externally coupled to the server 110. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 313 may transmit/receive data according to one or more of such wireless Internet technologies, and other Internet technologies as well.

The short-range communication module 314 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 315 is generally configured to detect, calculate, derive or otherwise identify a position of the server 110. As an example, the location information module 315 includes a Global Position System (GPS) module, a Wi-Fi module, or both.

The A/V input unit 320 may be configured to permit various types of input to the mobile terminal 120. Examples of such input include audio, image, video, data, and user input. Image and video input is often obtained using one or more cameras 321. Such cameras 321 may process image frames of still pictures or video obtained by image sensors in a video or image capture mode. The processed image frames can be displayed on the display unit 351 or stored in memory 360.

The processed image frames in the camera 321 can be stored in the memory 360, and can be transmitted to external device via the wireless communication unit 310. According to the user environment, at least two cameras 321 can be arranged in the server 110.

The microphone 322 is generally implemented to permit audio input to the mobile terminal 100. The audio input can be processed in various manners according to a function being executed in the mobile terminal 100. If desired, the microphone 322 may include assorted noise removing algorithms to remove unwanted noise generated in the course of receiving the external audio.

The user input unit 330 is a component that permits input by a user. Such user input may enable the controller 380 to control operation of the mobile terminal 100. The user input unit 330 may include one or more of a mechanical input element (for example, a key, a button located on a front and/or rear surface or a side surface of the mobile terminal 100, a dome switch, a jog wheel, a jog switch, and the like), or a touch-sensitive input, among others.

The sensing unit 340 is generally configured to sense one or more of internal information of the mobile terminal, surrounding environment information of the mobile terminal, user information, or the like. The controller 180 generally cooperates with the sending unit 340 to control operation of the server 110 or execute data processing, a function or an operation associated with an application program installed in the server 110 based on the sensing provided by the sensing unit 340. The sensing unit 340 may be implemented using any of a variety of sensors, some of which will now be described in more detail.

The output unit 350 is typically configured to output various types of information, such as audio, video, tactile output, and the like. The output unit 350 is shown having a display unit 351, an audio output module 352, an alarm unit 353, and a haptic module 354.

The display unit 351 is generally configured to output information processed in the server 110. For example, the display unit 351 may display execution screen information of an application program executing at the server 110 or user interface (UI) and graphic user interface (GUI) information in response to the execution screen information.

The display unit 351 outputs information processed in the mobile terminal 100. The display unit 351 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Some display is can be composed of transparent type or light penetration type. It can be called transparent display. For example, typical transparent display is TOLED (Transparent OLED). It can be applied to the all of specification. The back structure of the display unit 351 can be also composed of light penetration structure. According to the structure, the user can see the things that are located in the back side of the terminal body through the area occupied by the display unit 351 of the terminal body.

The display unit 351 may be implemented using two display devices, which can implement the same or different display technology. For instance, a plurality of the display units 351 may be arranged on one side, either spaced apart from each other, or these devices may be integrated, or these devices may be arranged on different surfaces.

A touch sensor can sense a touch applied to the touch screen, such as display unit 351, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 351, or convert capacitance occurring at a specific part of the display unit 351, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 380. Accordingly, the controller 380 may sense which region of the display unit 351 has been touched. Here, the touch controller may be a component separate from the controller 380, the controller 380, and combinations thereof.

The proximity sensor 341 may include a sensor to sense presence or absence of an object approaching a surface, or an object located near a surface, by using an electromagnetic field, infrared rays, or the like without a mechanical contact. The proximity sensor 341 may be arranged at an inner region of the mobile terminal covered by the touch screen, or near the touch screen.

The proximity sensor 341, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 341 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 341 may sense proximity touch, and proximity touch patterns (for example, distance, direction, speed, time, position, moving status, and the like).

In general, controller 380 processes data corresponding to proximity touches and proximity touch patterns sensed by the proximity sensor 341, and cause output of visual information on the touch screen. In addition, the controller 380 can control the mobile terminal 100 to execute different operations or process different data according to whether a touch with respect to a point on the touch screen is either a proximity touch or a contact touch.

The audio output module 352 is generally configured to output audio data. Such audio data may be obtained from any of a number of different sources, such that the audio data may be received from the wireless communication unit 310 or may have been stored in the memory 360. The audio data may be output during modes such as a signal reception mode, a call mode, a record mode, a voice recognition mode, a broadcast reception mode, and the like. The audio output module 352 can provide audible output related to a particular function (e.g., a call signal reception sound, a message reception sound, etc.) performed by the server 110. The audio output module 352 may also be implemented as a receiver, a speaker, a buzzer, or the like.

The alarm unit 353 can output the signal to notify the event occurrence of the server 110. For example, the event that occurs in the mobile terminal are receiving call signal, receiving a message, key signal input, touch input. The alarm unit 353 can output the signal to notify the occurrence of the event by other types besides video signal, audio signal. For example, the alarm unit 353 can output the signal to notify the occurrence of the event by the vibration. The display unit 351 and the audio output module 352 can be classified as a part of the alarm unit 353 since the video signal and audio signal can be outputted via the display unit 351 and audio output module 352.

A haptic module 354 can be configured to generate various tactile effects that a user feels, perceive, or otherwise experience. A typical example of a tactile effect generated by the haptic module 354 is vibration. The strength, pattern and the like of the vibration generated by the haptic module 354 can be controlled by user selection or setting by the controller. For example, the haptic module 354 may output different vibrations in a combining manner or a sequential manner. Besides vibration, the haptic module 354 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 354 can also be implemented to allow the user to feel a tactile effect through a muscle sensation such as the user's fingers or arm, as well as transferring the tactile effect through direct contact. Two or more haptic modules 354 may be provided according to the particular configuration of the terminal 110.

The memory 360 can store programs to support operations of the controller 380 and store input/output data (for example, phonebook, messages, still images, videos, etc.). The memory 360 may store data related to various patterns of vibrations and audio which are output in response to touch inputs on the touch screen.

The memory 360 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The server 110 may also be operated in relation to a network storage device that performs the storage function of the memory 360 over a network, such as the Internet.

The interface unit 370 serves as an interface for external devices to be connected with the server 110. For example, the interface unit 370 can receive data transmitted from an external device, receive power to transfer to elements and components within the server 110, or transmit internal data of the server 110 to such external device. The interface unit 370 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the server 110 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the server 110 via the port.

When the server 110 is connected with an external cradle, the interface unit 370 can serve as a passage to allow power from the cradle to be supplied to the server 110 or may serve as a passage to allow various command signals input by the user from the cradle to be transferred to the mobile terminal there through. Various command signals or power input from the cradle may operate as signals for recognizing that the server 110 is properly mounted on the cradle.

The controller can control overall operation of the server 110. The controller 380 can also perform the controlling and processing associated with voice calls, data communications, video calls, and the like, or perform pattern recognition processing to recognize a handwriting input or a picture drawing input performed on the touch screen as characters or images, respectively. In addition, the controller 380 can control one or a combination of those components in order to implement various exemplary embodiments disclosed herein. The multimedia module 381 can be implemented in the controller 380, and also it can be implemented independently with the controller 380. The controller 380 can perform pattern recognition processing that is available to recognize writing input, drawing input on the touch screen as a text, and image respectively.

The power supply unit 390 can receive external power or provide internal power and supply the appropriate power required for operating respective elements and components included in the server 110. The power supply unit 390 may include a battery, which is typically rechargeable or be detachably coupled to the terminal body for charging.

Various embodiments described herein may be implemented in a computer-readable medium, a machine-readable medium, or similar medium using, for example, software, hardware, or any combination thereof.

According to the embodiment of hardware, the embodiments of present invention is can be implemented based on at least one of ASICs, DSPs, DSPDs, PLDs, FPGAs, processer, controller, micro-controller, micro processer, electronic unit for performing other functions. Some embodiments of present invention described in the specification can be implemented by the controller 380 itself.

According to the embodiment of software, embodiments such as process, function described in the specification can be implemented as separate software modules. Each software module can perform at least one function and operation described in the specification. And the software code can be implemented as software application written by proper programming language. Herein, the software code can be stored in the memory 360, and can be executed by the controller 380.

Figure 4:
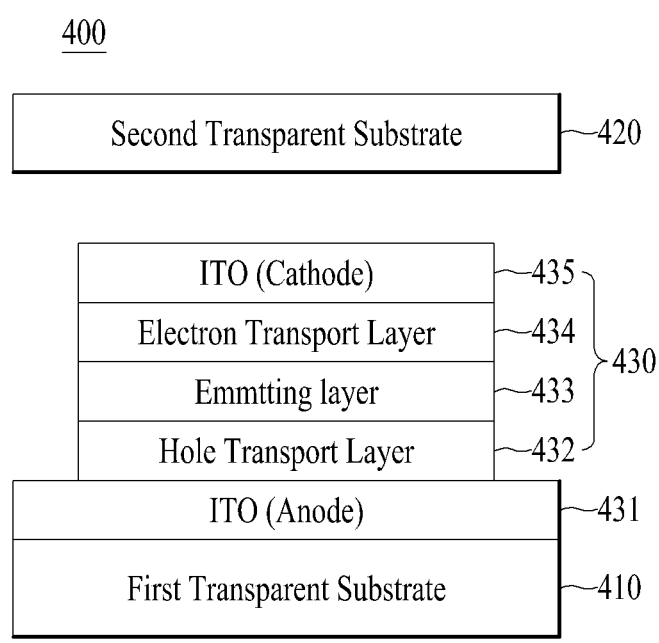
FIG. 4 is a cross-sectional view illustrating a display device according to one embodiment of the present invention.

FIG. 4 is a cross-sectional view illustrating a display device according to one embodiment of the present invention.

Referring to FIG. 4, a transparent display panel 400 may include a first transparent substrate 410, a second transparent substrate 420, and an image layer 430 arranged between the first transparent substrate 410 and the second transparent substrate 420. In this case, the image layer 430 arranged between the first transparent substrate 410 and the second transparent substrate 420 may be referred to as an organic cell.

The first transparent substrate 410 and the second transparent substrate 420 may have light transmission characteristics.

The image layer 430 may include an anode 431, a hole transport layer 432, an emitting layer 433, an electron transport layer 434, and a cathode 435.

In this case, if a voltage is applied to the cathode 435 and the anode 431, a contrast current is supplied, whereby electrons generated from the cathode 435 move to the emitting layer 433 through the electron transport layer 434.

Also, holes generated from the anode 431 move to the emitting layer 433 through the hole transport layer 432. At this time, the electrons supplied from the electron transport layer 434 collide with the holes supplied from the hole transport layer 432 in the emitting layer 433, whereby recombination of the electrons and the holes occurs. Light is generated from the emitting layer 433 by collision of the electrons and the holes.

Luminance of light generated from the emitting layer 433 may be proportional to a size of the contrast current supplied to the anode 431.

In this structure, if light is generated from the emitting layer 433, light may be emitted toward the first transparent substrate 410 or the second transparent substrate 420.

Therefore, a user may view a video through the first transparent substrate 410 or the second transparent substrate 420.

FIG. 4 illustrates an example of the transparent display panel 400, and the present invention is not limited to FIG. 4.

Figure 5:
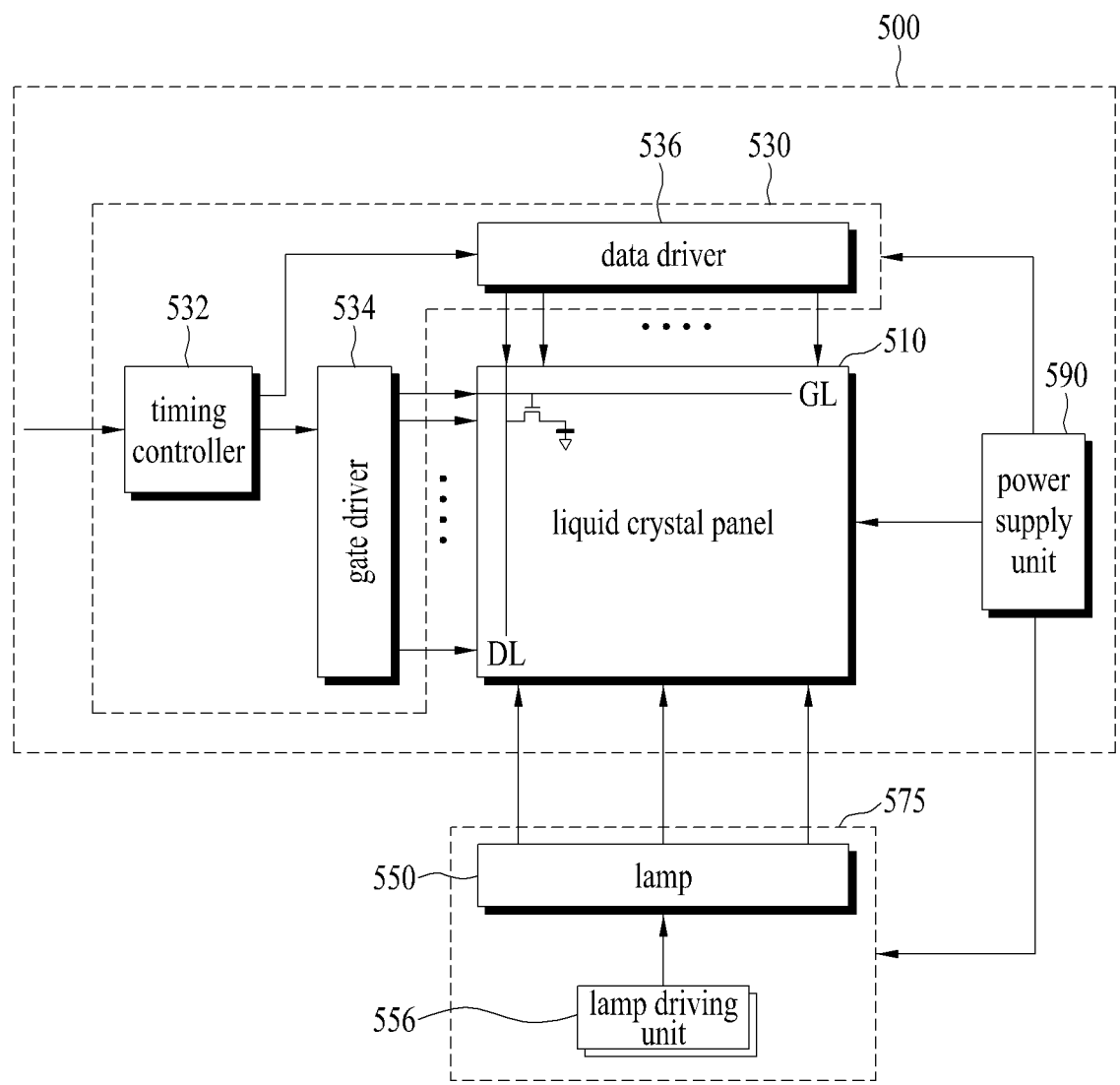
FIG. 5 is an internal circuit diagram illustrating a display device according to one embodiment of the present invention.

FIG. 5 is an internal circuit diagram illustrating a display device according to one embodiment of the present invention.

Referring to FIG. 5, a display device 500 includes a display panel 510 and a driving circuit unit 530.

Meanwhile, a conventional backlight unit is combined with the display panel 510 of the display device 500 and supplies generated light to the display panel 510.

However, according to the embodiment of the present invention, the backlight unit, that is, a light source unit 575 is arranged to be spaced apart from the display panel 510.

The display panel 510 spaced apart from the light source unit 575 is a transparent display panel, and displays a corresponding image if the image is input, wherein the image is displayed transparently to allow a product or space behind the display panel 510 to be seen.

The display panel 510 includes a first substrate on which a plurality of gate lines GL are arranged to cross a plurality of data lines DL in a matrix arrangement to display an image and a thin film transistor and a pixel electrode connected with the thin film transistor are formed in the crossed area, a second substrate provided with a common electrode, and a liquid crystal layer formed between the first substrate and the second substrate. Meanwhile, color filters for displaying colors may further be arranged on the second substrate.

The driving circuit unit 530 drives the display panel 510 through the control signal and the data signal supplied from the controller. To this end, the driving circuit unit 530 may include a timing controller 532, a gate driver 534, and a data driver 536.

The timing controller 532 controls the gate driver 534 and the data driver 536 in response to the control signal by receiving the control signal, R, G and B data signals and a vertical synchronization signal Vsync from the controller, and rearranges the R, G and B data signals and then provides the rearranged R, G and B data signals to the data driver 536.

Meanwhile, scan signals and video signals are supplied to the display panel 510 through the gate lines GL and the data lines DL under the control of the gate driver 534, the data driver 536 and the timing controller 532.

Although the timing controller 532, the gate driver 534 and the data driver 536 are provided in the driving circuit unit 530 in FIG. 5, modifications may be made in the elements of FIG. 5.

The light source unit 575 supplies light. The light source unit 575 may include lamps 550 which are light sources, and a lamp driving unit 556 for turning on/off the lamps 550. If the plurality of lamps 550 are turned on, light emitted from the lamp 550 is irradiated to the product.

Meanwhile, the display panel 510 may display a video based on an input video signal by using the irradiated light.

The plurality of lamps 550 may include light emitting diodes (LEDs).

The power supply unit 590 may supply a common electrode voltage Vcom to the display panel 210 and supply a gamma voltage to the data driver 536. Also, the power supply unit 590 may supply a driving power source for driving the lamp 550 to the light source unit 575.

Figure 6:
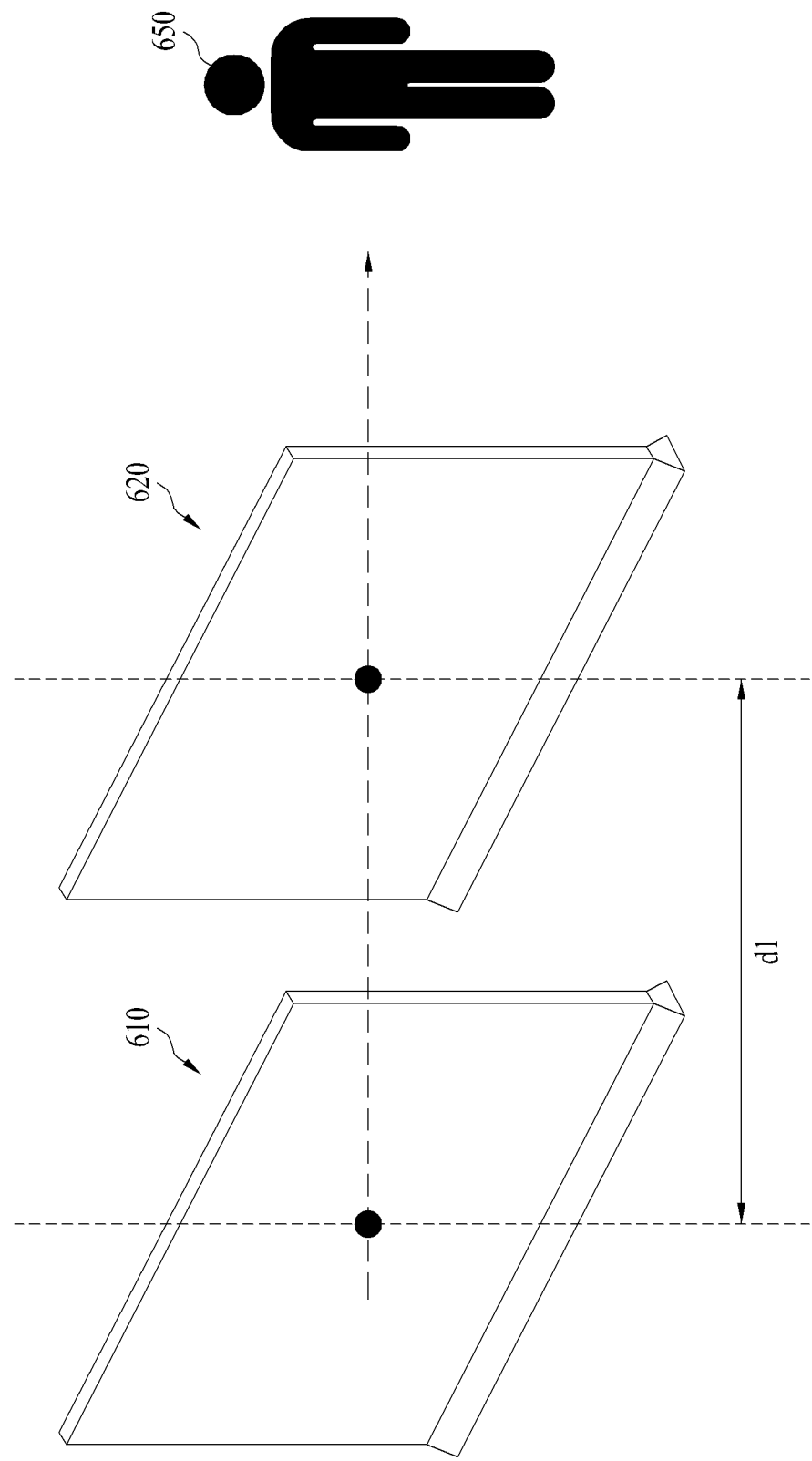
FIGS. 6 and 7 are schematic diagrams illustrating a digital signage system according to one embodiment of the present invention.
Figure 7:
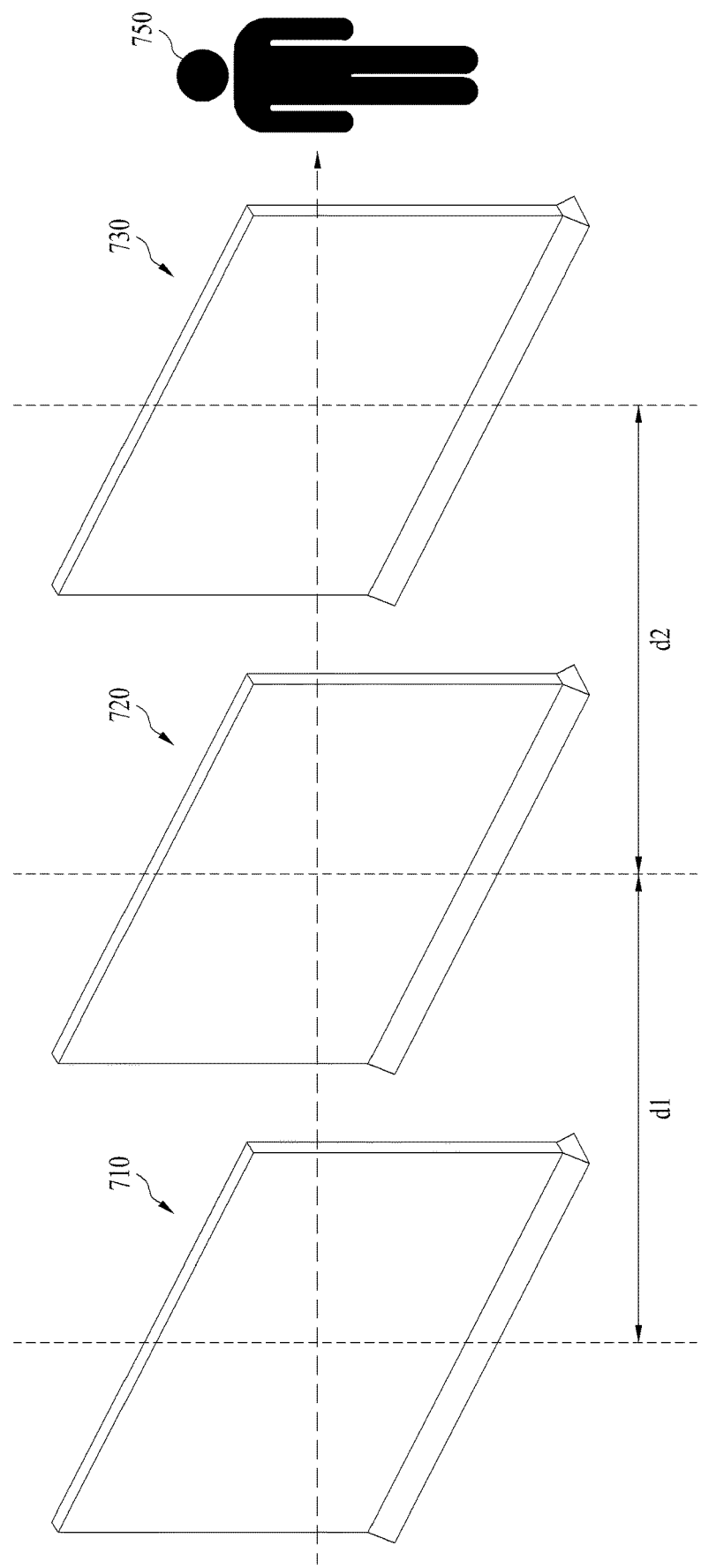
Figure 8:
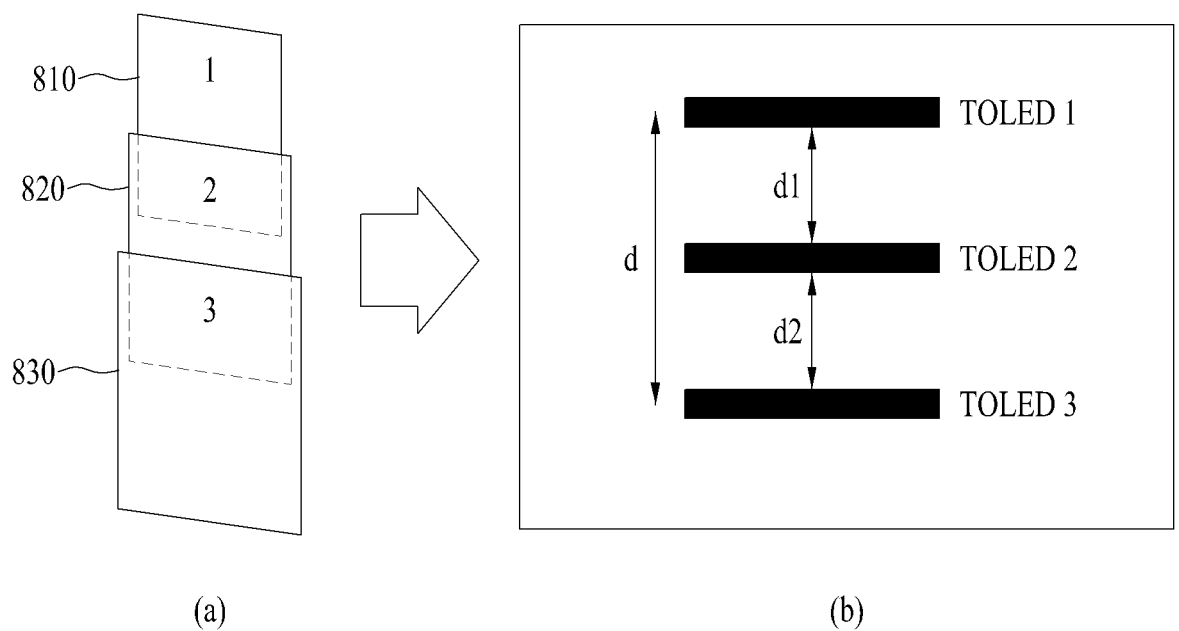
FIG. 8 is a view illustrating a function of a controller of a digital signage system according to one embodiment of the present invention.

FIGS. 6 and 7 are schematic diagrams illustrating a digital signage system according to one embodiment of the present invention, and FIG. 8 is a view illustrating a function of a controller of a digital signage system according to one embodiment of the present invention.

Hereinafter, it will be apparent that a server is included in the digital signage system even though the server is not shown for convenience of description.

FIG. 6 illustrates a digital signage system that includes two display devices, and FIG. 7 illustrates a digital signage system that includes three display devices.

First of all, referring to FIG. 6, a first display device 610 and a second display device 620 are arranged at the front of a reference 650 such as a user or a predetermined point.

The first display device 610 and the second display device 620 are arranged at a predetermined distance, that is, spatial interval d1. In this case, it is preferable that the spatial interval d1 is a predetermined threshold spatial interval or less.

The display devices 610 and 620 are aligned, but not limited to, in series from the reference 650 as an embodiment. Therefore, although the display devices 610 and 620 are arranged at the front of the reference 650, it is preferable that a straight line shape is drawn when a parallel line from the reference 650 to the display devices 610 and 620 is assumed. It is noted from the straight line shape that at least a partially overlapped screen area of display screens of the respective display devices exists on the basis of the reference 650.

Both the first display device 610 and the second display device 620 may be transparent display devices or any one of them may be a transparent display device. In case of the latter case, for example, the display device on which one image is displayed based on the reference in FIG. 6, that is, the first display device 610 may be at least one of a digital TV, a monitor, and a mirror not the transparent display device, while the second display device 620 may be the transparent display device.

Next, referring to FIG. 7, a total of three display devices, a first display device 710, a second display device 720 and a third display device 730 are arranged at the front of the reference 650 unlike FIG. 6.

The first display device 710 and the second display device 720 are arranged at a first spatial interval d1, and the second display device 720 and the third display device 730 are arranged at a second spatial interval d2. Preferably, each of the first spatial interval d1 and the second spatial interval d2 is a predetermined threshold spatial interval or less. Also, the first spatial interval d1 and the second spatial interval d2 may have the same spatial interval, that is, constant interval or not.

The display devices 710, 720 and 730 are aligned, but not limited to, in series from the reference 650 as an embodiment.

In FIG. 7, at least one of the first to third display devices 710 to 730 may be a transparent display device. For example, the display device on which one image is displayed based on the reference in FIG. 7, that is, the first display device 710 may be at least one of a digital TV, a monitor, and a mirror not the transparent display device, while the second display device 720 and the third display device 730 may be the transparent display devices.

In the above description, the server or the controller of the server (for convenience, hereinafter, referred to as 'controller') may randomly adjust or control the spatial interval between the display devices.

Next, FIG. 8 relates to a method for managing and controlling a digital signage system at a server terminal.

FIG. 8a illustrates that three display devices 810, 820 and 830 are vertically arranged.

FIG. 8b illustrates UI/UX that includes data related to the display devices 810, 820 and 830 of the controller of the server terminal.

The controller of the server terminal may identify information on the display devices 810, 820 and 830 arranged vertically as shown in FIG. 8a through the UI/UX of FIG. 8b. Referring to the UI/UX of FIG. 8b, the controller may identify arrangement shape, relative position, spatial distances (d, d1, d2, etc.), arrangement angle, etc. of the display devices on the basis of a predetermined random reference. At this time, the UI/UX may be provided in the form of a navigation map to assist identification convenience of a user. Meanwhile, the UI/UX may be provided through software, firmware, etc. In addition, the controller may include information on a signage content for the display devices 810, 820 and 830 in the UI/UX. In this case, the information on the signage content may include various kinds of information such as attribute and type of the signage content and display on/off time of each display device.

As described above, the UI/UX of FIG. 8b is intended for management and control of the display devices 810, 820 and 830 of FIG. 8a, and may be provided together with various functional keys, input keys, etc. for the management and control, although not shown.

Also, the controller may acquire information on the display devices through the UI/UX of FIG. 8b in real time, as described later. For example, even in the case that an event such as removal, position change, angle change, and failure occurs in at least one of the display devices or a new display device is additionally provided, this event or addition of the new display device may be identified through the UI/UX and then managed and controlled. This will be described later in detail.

Figure 9:
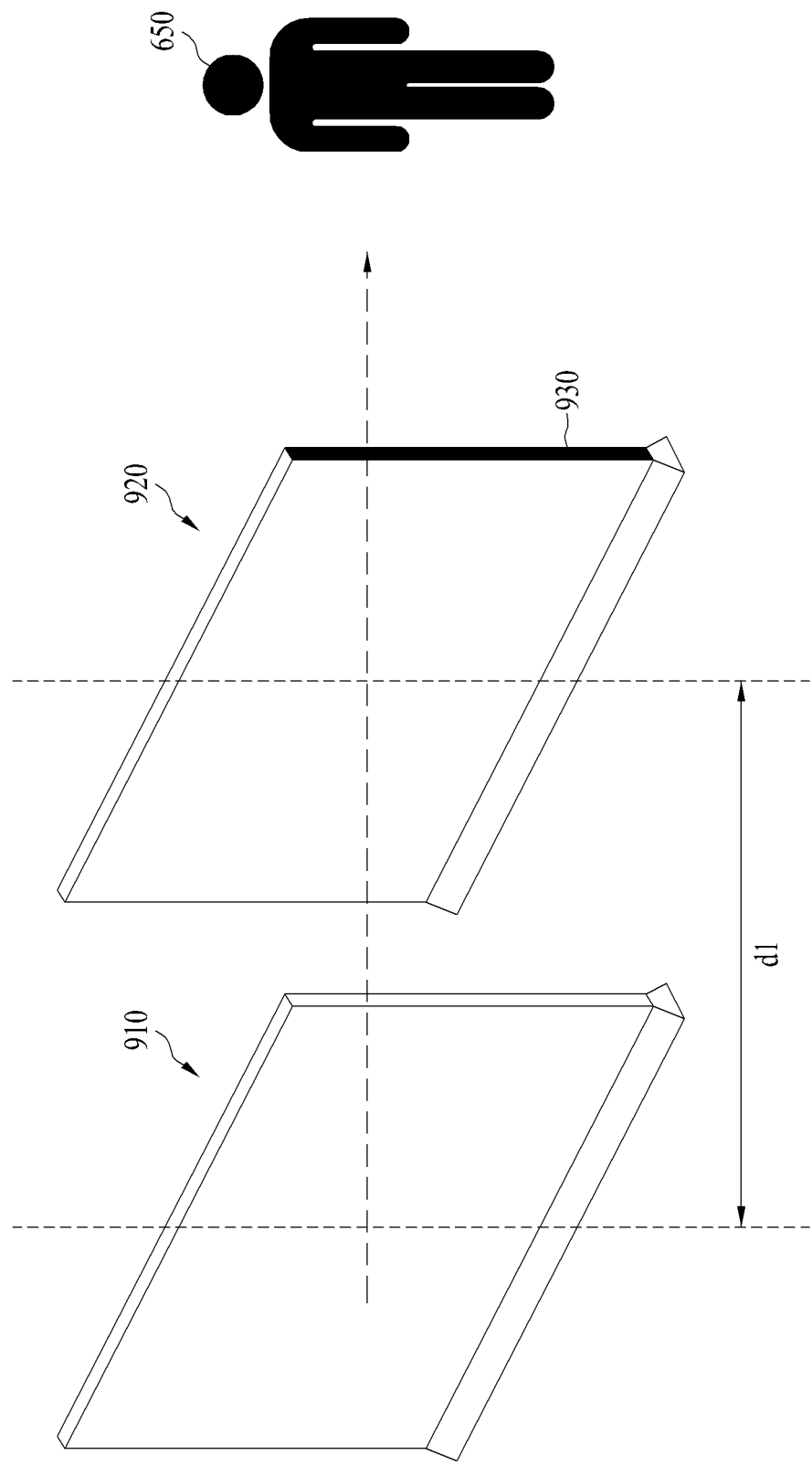
FIG. 9 is a view illustrating a digital signage system according to another embodiment of the present invention.

FIG. 9 is a view illustrating a digital signage system according to another embodiment of the present invention.

Unlike the digital signage system of FIG. 6, although two display devices 910 and 920 are arranged in series at a predetermined spatial interval d1 on the basis of the reference 650 in FIG. 9, the first display device 910 and the second display device 920 are different from each other in their sizes.

For example, referring to FIG. 9, it is noted that the size of the second display device 920 is relatively greater than that of the first display device 910. Although not shown, the sizes of the display devices may be contrary to FIG. 9.

This is equally applied to the case that display device(s) is(are) additionally provided. In other words, it is not required that two or more display devices constituting the digital signage system should have the same size.

Meanwhile, referring to FIG. 9, a lamp unit 930 may be attached to all or at least one of the display devices which belong to the digital signage system. An example of the lamp unit may include LED (light emitting device). In FIG. 9, it is noted that the lamp unit 930 is attached to one side of the second display device 920. This is only exemplary, and the lamp unit may be attached to another side or an object for holding the display device.

Although the lamp unit 930 may directly be attached to the corresponding display device, the lamp unit 930 may be attached to the periphery of the display device. Also, the lamp unit 930 may detachably be attached to the display device.

The lamp unit 930 will be described in more detail with reference to FIGS. 10 to 12.

Figure 10:
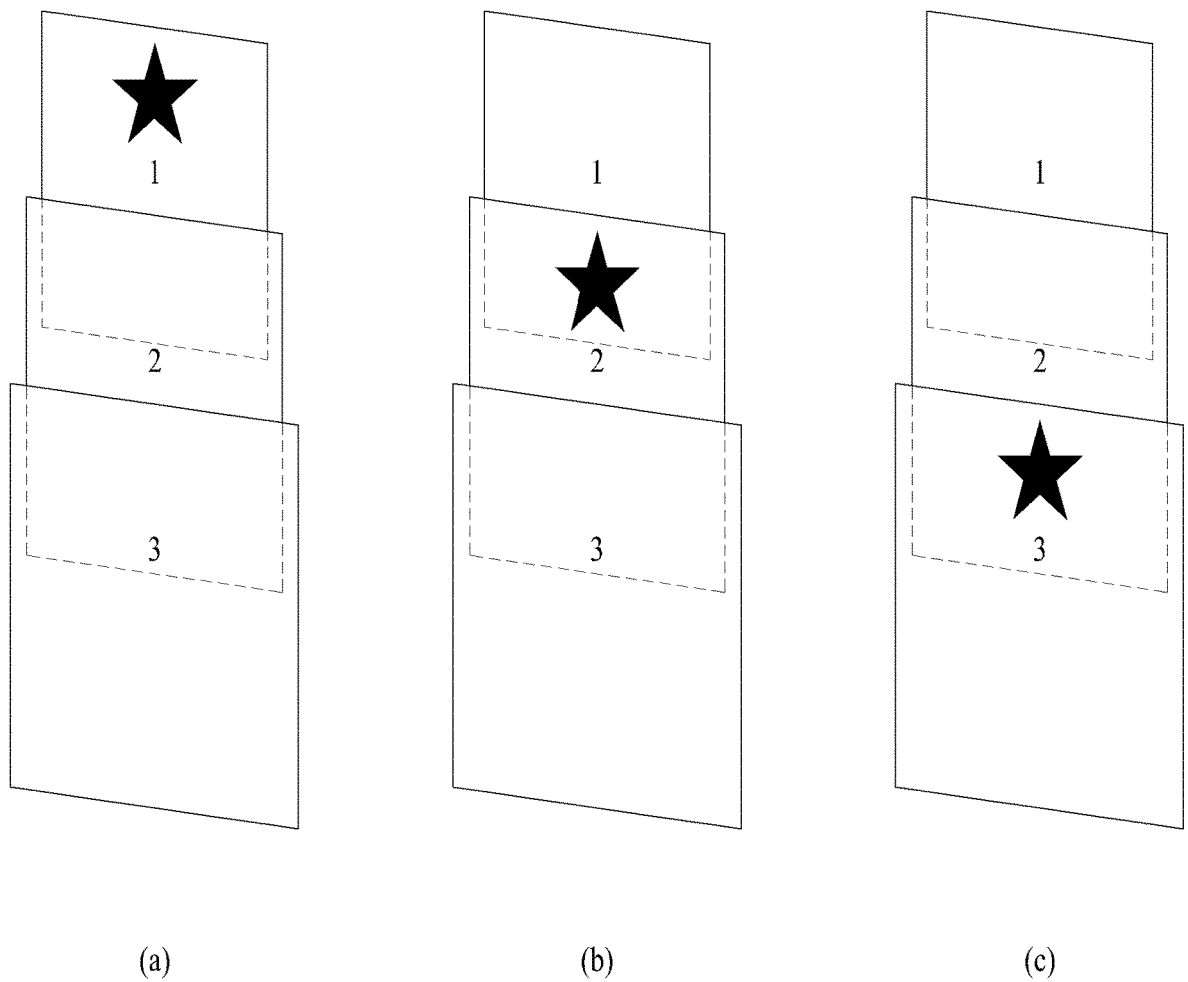
FIGS. 10 to 12 are views illustrating an image display time interval in a display device according to the embodiment of the present invention.
Figure 11:
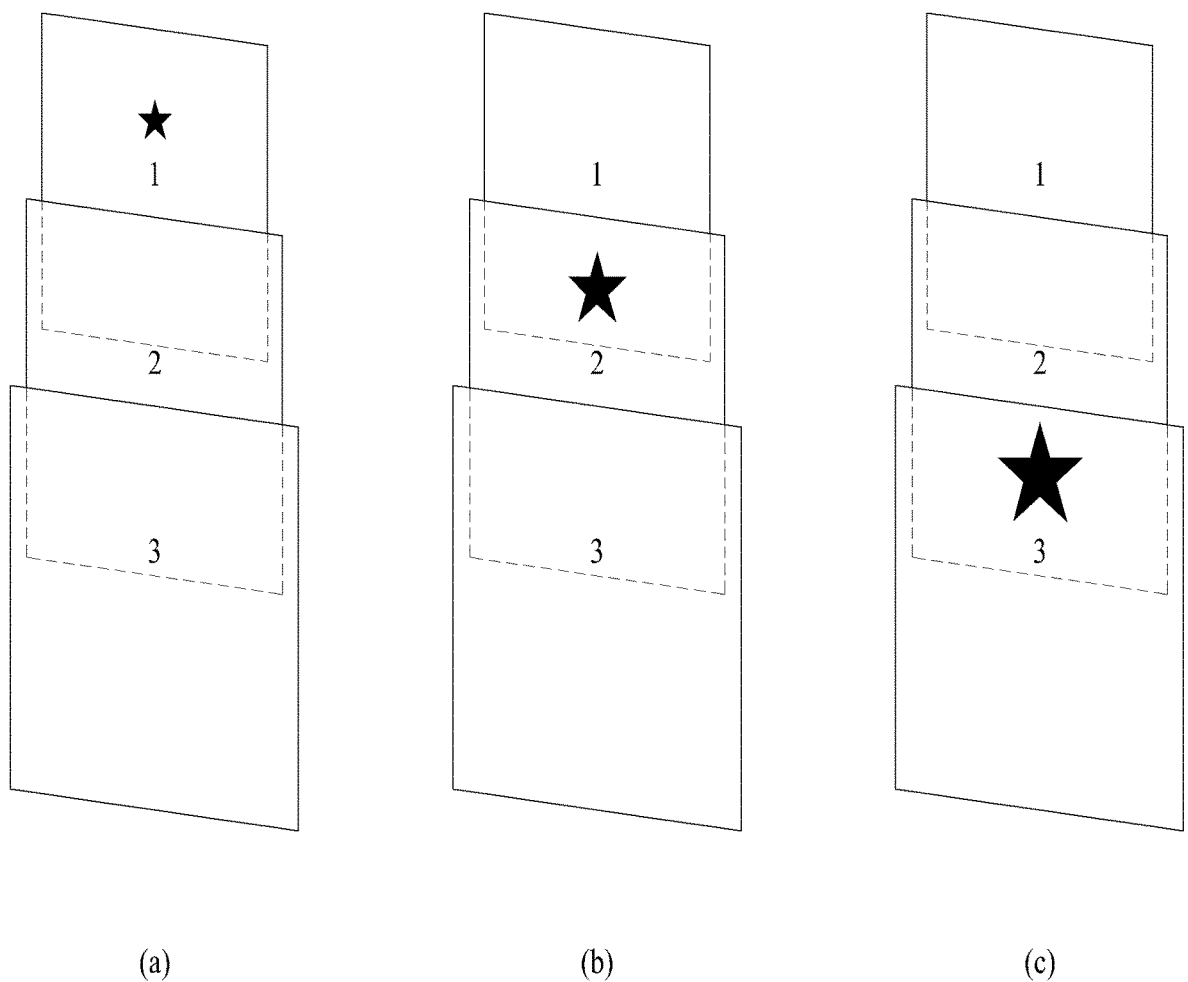
Figure 12:
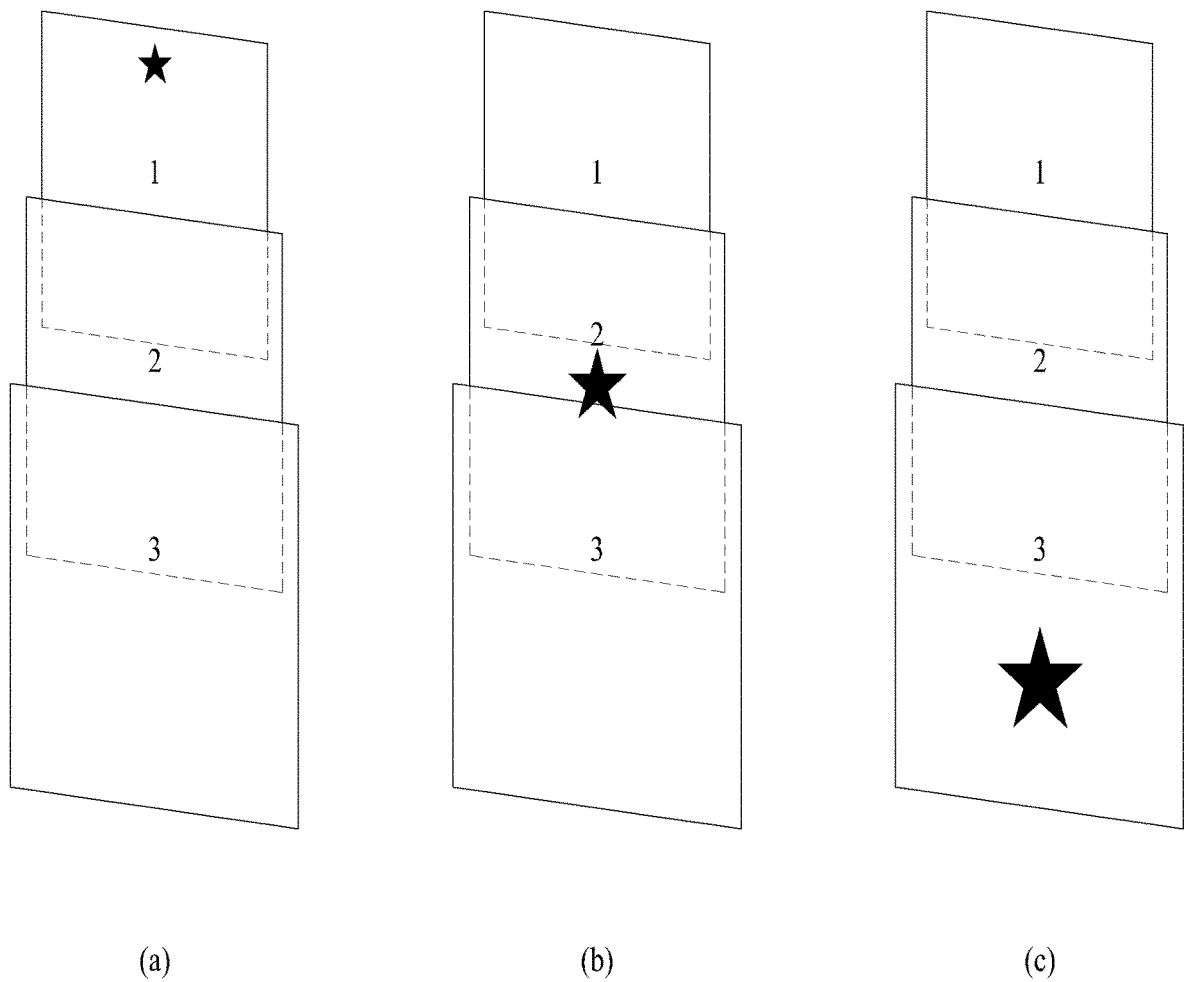

FIGS. 10 to 12 are views illustrating an image display time interval in a display device according to the embodiment of the present invention.

In FIGS. 10 to 12, for convenience of description, three display devices are vertically arranged in series from a reference (not shown).

Hereinafter, in addition to the spatial interval in the digital signage system, time interval, that is, image display in the display devices will be described.

The controller of the server terminal may control one image to be displayed at a predefined time interval regardless of the spatial interval of the display devices constituting the digital signage system.

However, in this specification, the controller of the server terminal determines a time interval considering the spatial interval of the display devices constituting the digital signage system to display one image.

Although the controller of the server terminal applies a predefined spatial interval and time interval to the display devices constituting the digital signage system, if the spatial interval and time interval are different from the defined intervals, the controller of the server terminal may randomly adjust and control the spatial interval or/and the time interval. Also, if there is a change in at least one of the spatial interval and time interval initially set by a predetermined event, the controller of the server terminal may control the interval correspondingly.

In this case, the predefined time interval is preferably, but not limited to, 40 ms or less to allow the user to feel apparent movement of an image displayed through the display devices. Meanwhile, the time interval may be varied depending on attribute or type of the image.

If the spatial interval is defined, in accordance with one embodiment of the present invention, the controller of the server terminal may control the time interval of each display device.

In this case, the time interval may mean from the display on-timing of image on one display device to the display off-timing of image on next display device on which image will be displayed. Alternatively, the time interval may mean from the display on-timing of image on one display device to the display on-timing of image on next display device on which image will be displayed. This time interval is randomly defined for convenience of description in this specification without limitation to the above meanings and may be referred to as various titles such as display on/off-timing.

The controller of the server terminal determines a predetermined unit constituting the digital signage system, for example, a spatial interval of display devices which belong to a group.

The controller of the server terminal may perform a control operation as follows in accordance with the determined result.

As a result of the determination of the spatial interval, if the spatial interval of the display devices is a first interval or a constant interval, the controller of the server terminal may control a single image display time interval of the display devices to be the same time interval, that is, the constant time. In this case, the first interval means an allowable interval to permit the single image display time interval as the same or constant time even though the first interval is not the constant interval. For example, the first interval may mean an interval within a predetermined threshold value from the constant interval even though it is not the constant interval.

As a result of the determination of the spatial interval, if the spatial interval of the display devices is not the first interval or the constant interval, the controller of the server terminal may control a single image display time interval of the display devices so as not to be the same time interval. This means that the controller of the server terminal determines the time interval in comparison with the spatial interval of the display devices.

For example, it is assumed that the spatial interval between the first display device and the second display device is d1, the spatial interval between the second display device and the third display device is d2, and the spatial interval is not the first interval or the constant interval when the d1 and the d2 are compared with each other. In this case, the controller of the server terminal sets a time interval ti1 of a single image display time between the first display device and the second display device differently from a time interval ti2 of a single image display time between the second display device and the third display device. For example, as a result of the comparison of the spatial intervals between the respective display devices, if d1>d2 is obtained, the controller of the server terminal may set the time interval between the display devices as ti1<ti2. However, it is preferable that each of the ti1 and the ti2 is the threshold value or less and the exact time interval is determined in comparison with the spatial interval in accordance with the predetermined rule.

As a result of the determination of the spatial interval, even though the spatial interval of the display devices is not the first interval or the constant interval, the controller of the server terminal may control the single image display time interval of the display devices to be the same time interval. In this case, the controller of the server terminal may set the time interval to a predetermined threshold value.

Meanwhile, the controller of the server terminal may randomly continue to change and set a predetermined event or the spatial interval and the time interval of the display devices even though the spatial interval and the time interval of the display devices are previously set. In this case, the event may be defined variously, may correspond to the case that a predetermined display device is out of order, or the time interval or the spatial interval may be controlled for a corresponding image only or wholly to maximize digital signage effect in view of characteristics of the signage content.

Referring to FIG. 10, the controller of the server terminal previously sets the time intervals ti1 and ti2 in accordance with the spatial intervals d1 and d2 of the display devices constituting the digital signage system.

Therefore, the controller of the server terminal controls the initial image to be displayed on the first display device as shown in FIG. 10a. If the image is displayed on the first display device as shown in FIG. 10a, the controller of the server terminal controls the second display device to display the image as shown in FIG. 10b with reference to the set time interval ti1. If the image is displayed on the second display device as shown in FIG. 10b, the controller of the server terminal the controls the third display device to display the image as shown in FIG. 10c with reference to the set time interval ti2. As described above, as the controller of the server terminal controls the image display timing of each of the display devices sequentially arranged, if the reference views the digital signage system, especially the third display device, the user may feel apparent movement of the image in accordance with the passage of time as shown in FIG. 17a. This is equally applied to a reverse case of FIG. 17a as shown in FIG. 17b. In this case, the time interval of FIG. 17a and the time interval of FIG. 17b may be the same as each other or not.

Referring to FIGS. 10a to 10c, the single image is displayed on the display devices constituting the digital signage system at the same position and the same size during sequential display.

By contrast, in FIGS. 11a to 11c, it is noted that the size of the single image is gradually varied in accordance with the display order to emphasize apparent movement of the displayed image even though the single image is displayed on the same position. For example, in FIGS. 11a to 11c, the same image is displayed but a size of an object within the image in FIG. 11a is primarily enlarged in FIG. 11b and then secondarily enlarged in FIG. 11c, whereby it is noted that the size of the object within the image in FIG. 11c is enlarged in comparison with FIG. 11a. As a result, the user may feel apparent movement, for example, approach of the object of the image with the size increase when viewing the image. This is equally applied to the reverse order of FIGS. 11a to 11c.

Also, unlike FIG. 10, in FIGS. 12a to 12c, as the display position of the object within the image is changed, the size of the object within the image is changed like FIG. 11. In this case, the user may feel dynamic movement of the object within the image as compared with FIGS. 10 and 11. For example, the object within the image is displayed on the first position of the first display device at the first size in FIG. 12a, the object within the image is displayed on the second position of the second display device at the second size in FIG. 12b, and the object within the image is displayed on the third position of the third display device at the third size in FIG. 12c.

Meanwhile, referring to FIGS. 10 to 12, the controller of the server terminal may control brightness of each display device. At this time, the controller may use the lamp unit described in FIG. 9 to control brightness of each display device. The controller may control brightness of the display device, on which the single image is displayed currently, differently from brightness of the other display device(s) on which the single image is not displayed currently. For example, the controller of the server terminal may control brightness of the display device, on which the single image is displayed currently, to be brighter than brightness of the other display device(s) on which the single image is not displayed currently. In FIG. 9, the lamp unit may be provided only when the corresponding display device is a transparent display. In this case, the lamp unit may control brightness under the control of the controller of the server terminal considering peripheral illuminance to allow the corresponding display device, which is a transparent display, to be more transparent. For example, if the lamp unit controls brightness of the corresponding display device to be brighter than peripheral illuminance, transparency of the corresponding display device may be more improved. In this way, supposing that the lamp unit is attached to all display devices constituting the digital signage system, the controller may set all the display devices to a specific brightness level or off-state, and then may allow the corresponding display device to be brighter or darker than the other display devices at the image display on/off timing, whereby the effect of apparent movement may be more improved.

When the digital signage system is a default state, the controller controls brightness of each display device to be set differently from each other, and may control brightness of each display device to allow the display device, which is arranged to be the farthest away from the reference, to be the darkest.

FIGS. 13 to 16 are views illustrating a method for controlling a display device according to events of a digital signage system in accordance with one embodiment of the present invention.

Figure 13:
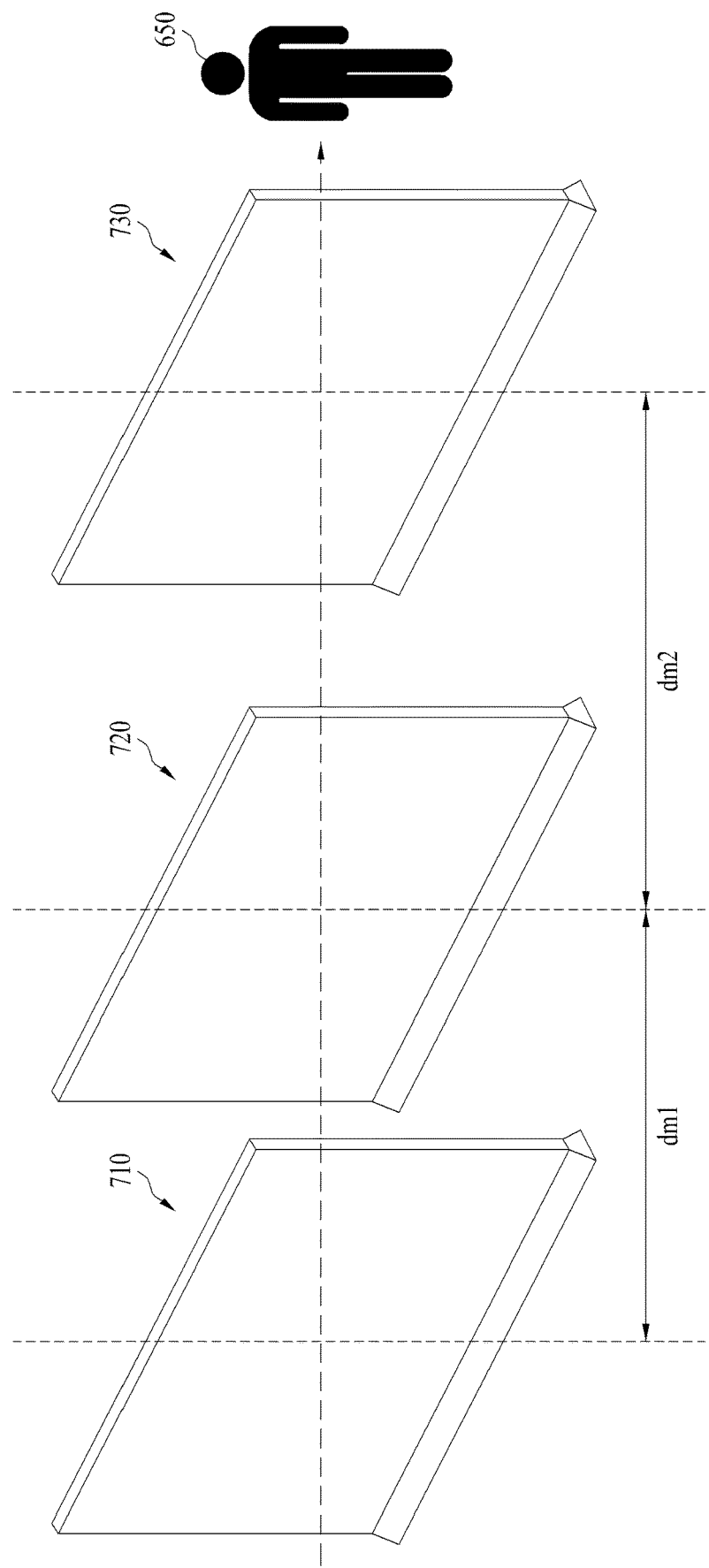
Figure 14:
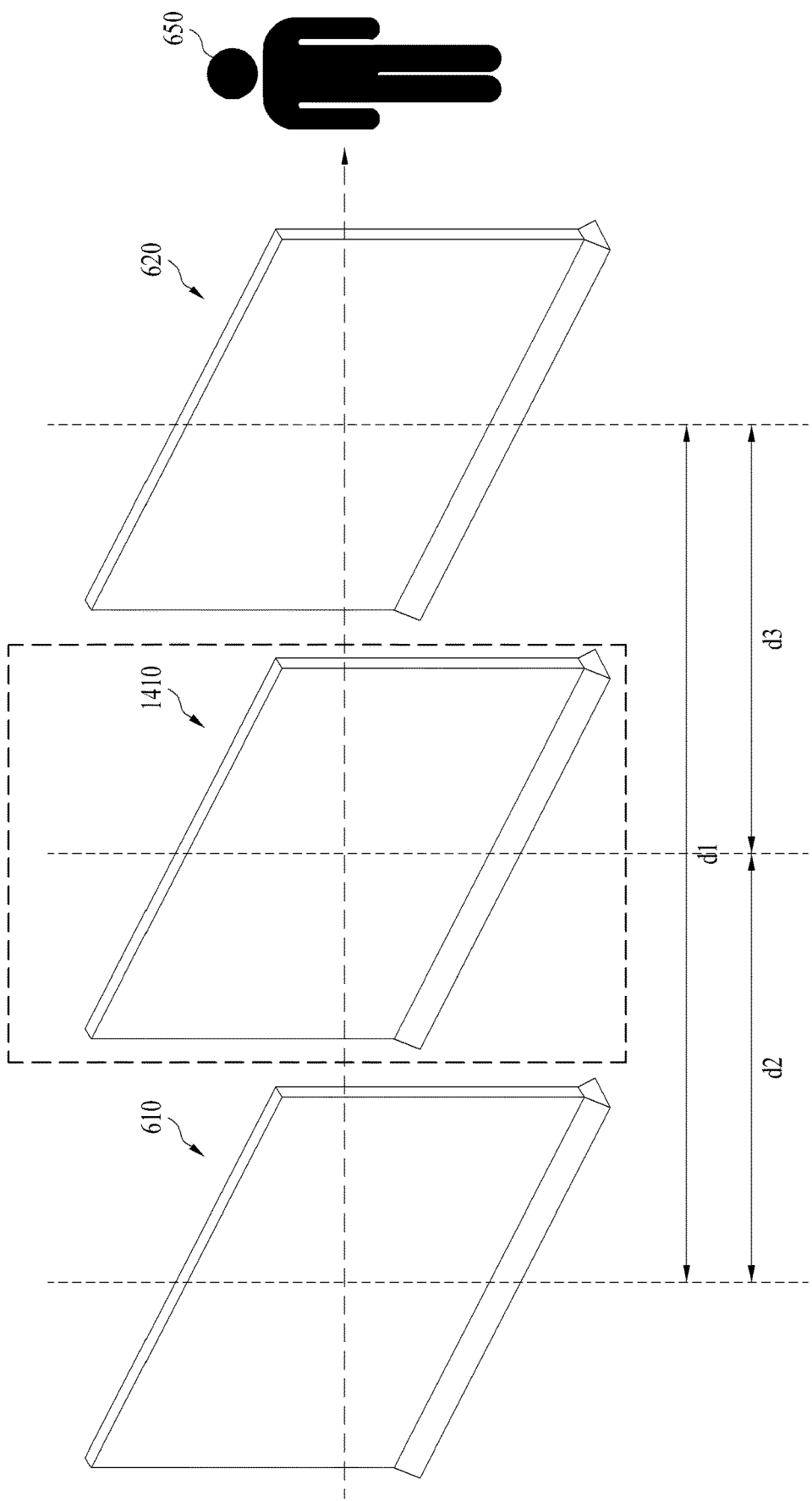

FIGS. 13 to 15 relate to correspondence according to an event of the digital signage system. State information of the digital signage system according to the event may be sensed by and reported to the controller of the server in the form of UI/UX of FIG. 8 or 16.

In FIG. 13, it is noted that a spatial interval dm2 between the second display device 720 and the third display device 730 is varied in comparison with the spatial interval d2 of FIG. 2.

Although the controller of the server terminal may change the spatial interval from d2 to dm2, if the spatial interval is changed, the controller controls the digital signage system in accordance with the change of the spatial interval. For example, the controller may adjust and control the time interval for the display devices constituting the digital signage system. At this time, the controller may not or may change and control the time interval for the display devices of which spatial interval is not changed. Generally, the controller changes and controls the time interval (t2→t2') between the display devices of which spatial interval is changed. However, in this case, if the time interval is also changed and controlled in accordance with the change of the spatial interval, since it affects the time interval between the other display devices constituting the digital signage system, the controller determines whether to change and control the image display time interval between the other display devices of which spatial interval is not changed, considering the effect of apparent movement. For example, if the change of the spatial interval and the change of the time interval based on the change of the spatial interval are determined at a value less than a predetermined threshold value, the controller may not control the change of the spatial interval or the time interval between the other display devices even though the spatial interval and the time interval are changed.

In FIG. 14, a new display device 1410 is additionally provided between the first display device 610 and the second display device 620 of FIG. 6.

Unlike FIG. 13, the entire arrangement of the digital signage system is changed in FIG. 14. A new display device may be inserted between the display devices constituting the legacy digital signage system as shown in FIG. 14 or may be added outside both the display devices, or at least one of the display devices constituting the digital signage system may be removed.

In this case, the controller may determine whether to newly collect information on the display devices of the digital signage system. For example, if the new display device is additionally provided, a spatial interval and a time interval between the added display device and its adjacent display device may be identified. However, in case of the above insertion or removal, it is preferable to newly identify information on the entire configuration of the digital signage system. For example, if the new display device is inserted as shown in FIG. 14, the controller resets information on the display devices constituting the legacy digital signage system and newly collects corresponding information. The controller may control the digital signage system by newly setting the information such as the spatial interval and the time interval on the basis of the information changed in comparison with the legacy information.

In FIG. 15a, it is noted that a specific display device is inclined at a predetermined angle θ1 or θ2 on the basis of a reference surface of at least one display device constituting the digital signage system. At this time, it is assumed that the display device is installed vertically based on the reference surface. Meanwhile, the reference surface may be a ground or a predetermined space on the ground.

If the specific display device is inclined at a predetermined angle based on the reference surface as above, and if an element for angle compensation is included in the corresponding display device, the controller compensates for the angle in accordance with the element for angle compensation, and if not so, the controller may transmit a signal indicating that there is a problem such as failure related to angle compensation, to a system manager or a digital device such as a smart phone.

Meanwhile, FIGS. 15a to 15c may be reviewed in another aspect. For example, the controller may control at least one or all of the display devices constituting the digital signage system to be inclined at a predetermined angle based on the reference surface as shown. For example, as shown in FIG. 15b or 15c, if the digital signage system is provided on a space such as ceiling, instead of the ground, the controller may appropriately change and control the angle in accordance with the reference or other event, image which will be displayed, that is, signage content. This is equally applied to the case that the digital signage system is provided on the ground as shown in FIG. 15a.

Meanwhile, FIG. 16a illustrates that the controller displays a newly added display device on the UI/UX if the new display device is added to the digital signage system.

FIG. 16b relates an embodiment that guide information is provided for convenience of arrangement or alignment of the newly added display device when the new display device is added to the digital signage system. In this way, if the guide information is provided, convenience in installing the display device may be provided to the system manager, installer, etc.

FIG. 17 is a view illustrating an effect of apparent movement through display devices of a digital signage system according to one embodiment of the present invention.

FIG. 17a illustrates apparent movement in which an image approaches to a reference in accordance with the passage of time, and FIG. 17b illustrates apparent movement in which an image is far away from a reference in accordance with the passage of time.

Figure 18:
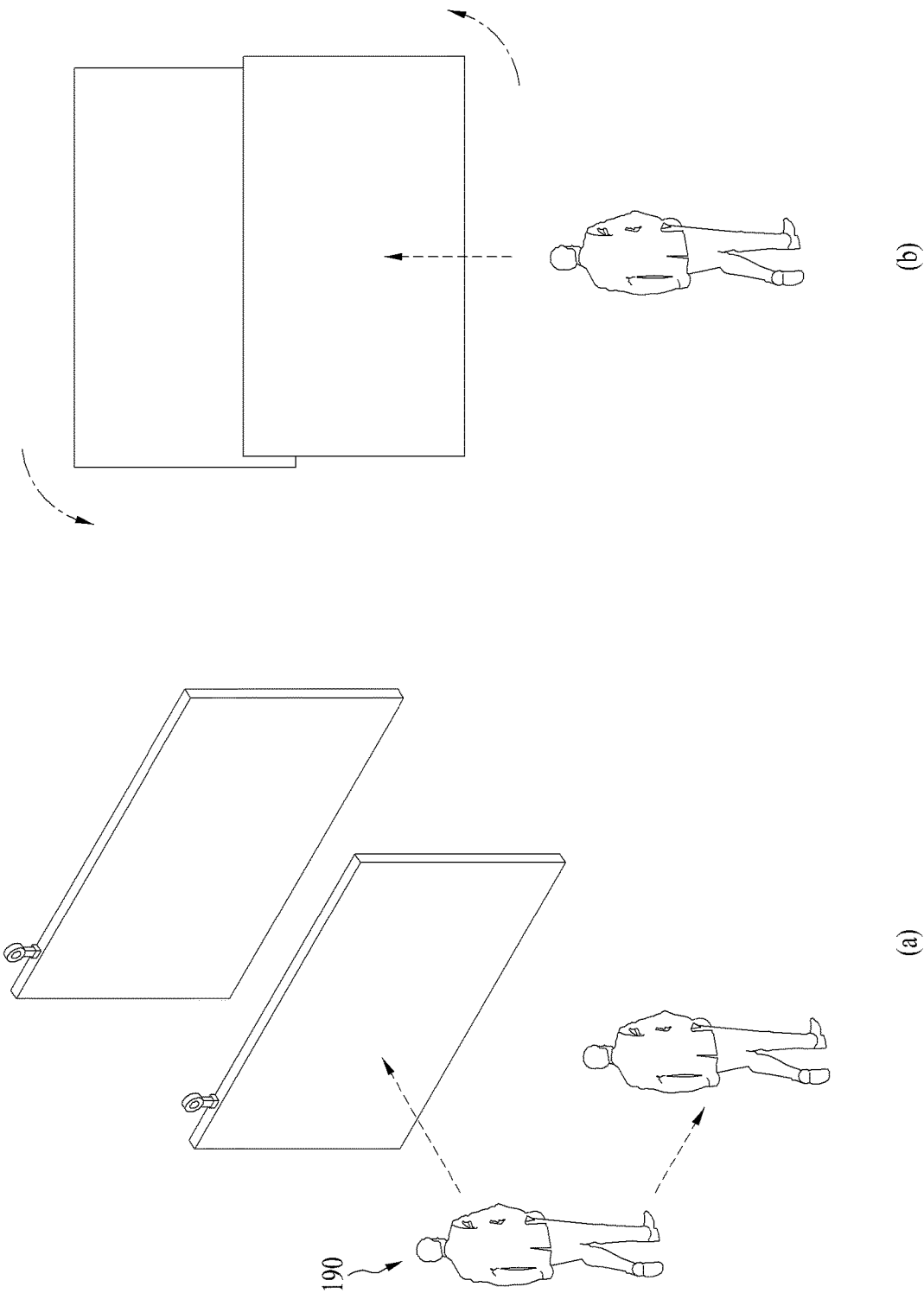
FIG. 18 is a view illustrating a method for controlling a display device of a digital signage system based on reference movement or change in accordance with one embodiment of the present invention.

FIG. 18 is a view illustrating a method for controlling a display device of a digital signage system based on reference movement or change in accordance with one embodiment of the present invention.

According to the present invention, the controller of the server terminal may control up and down movement, left and right movement, rotation, etc. of at least one or all of the display devices randomly or in accordance with an event even though the display devices constituting the digital signage system are fixed on a predetermined space.

As shown in FIG. 18a, if a user changes, that is, moves a signage content from a reference1 1810 to a position of a reference2 1820 through two display devices 1 and 2 while viewing a signage content, the controller determines whether the user continues to view the signage content, through the digital signage. At this time, the controller may use data of a camera sensor provided in or attached to at least one display device or a sensor provided in the periphery of the other display device, if necessary, when determining the user's intention. Meanwhile, movement of the user from the reference1 1810 to the reference2 1820 may be recognized through the camera sensor or/and the sensor.

As a result of the determination, if it is determined that the user intends to continue to view the signage content, the controller may change the rotation angle of all or at least one of the display devices constituting the digital signage system and provide all or at least one of the display devices as shown in FIG. 18b to allow the user, who has moves to the reference2 1820, to easily view the display device.

At this time, the controller may change the rotation angle for viewing convenience of the user who has moved the display device 2 closes to the reference instead of the sensor to the reference2 1820, unlike the aforementioned description, when determining the user's intention. Alternatively, as an example of control of the digital signage system in accordance with the determined result, the controller may add or finally control rotation change the other display device 1 in accordance with the user's response after controlling rotation change of the display device 2 closest to the reference.

Meanwhile, although not shown, if the user moves from the reference1 1810 to a reference opposite to the reference1 1810, for example, the controller may reversely control the display devices in the sequential order of the signage content without controlling rotation of the display devices. For example, when there is a user in the reference1, the controller may control the signage content displayed in the order of the display device 1→the display device 2 to be displayed in the order of the display device 2→the display device 1 if the user moves to the reference of the opposite position. Meanwhile, in this control case, the controller may set the spatial interval and the time interval reversely or differently depending on the image display order change.

In addition, if rotation of the display devices is controlled in response to the user's movement, the spatial interval and time interval applied to the display devices constituting the digital signage system prior to the movement may be applied as they are, or may be reset and newly set.

Figure 19:
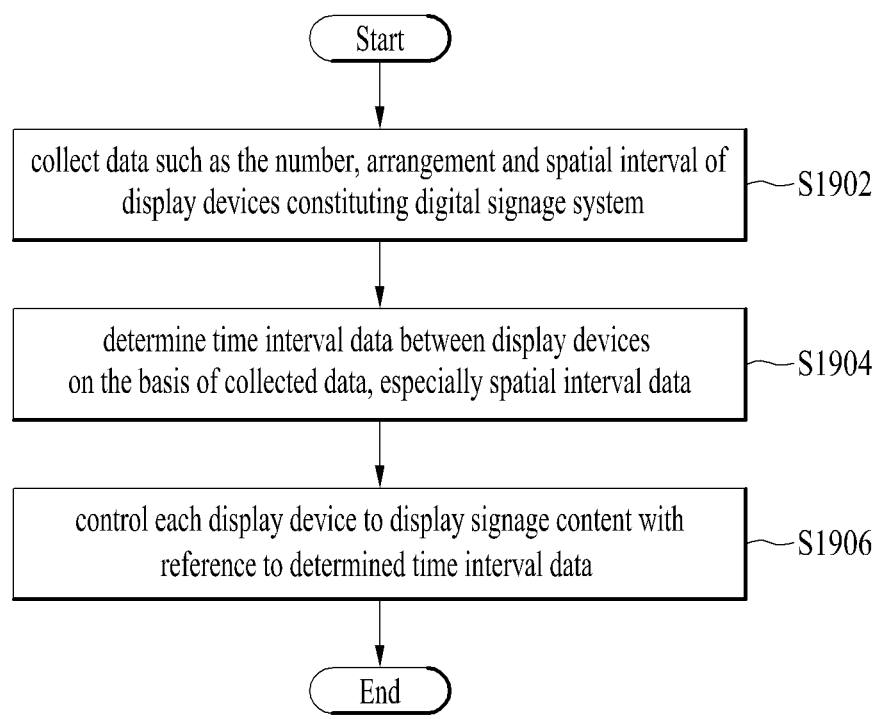
FIG. 19 is a flow chart illustrating a data processing method in a digital signage system according to one embodiment of the present invention.

FIG. 19 is a flow chart illustrating a data processing method in a digital signage system according to one embodiment of the present invention.

The controller of the server terminal collects data such as the number, arrangement and spatial interval of display devices constituting the digital signage system (S1902).

The controller determines time interval data between the display devices on the basis of the collected data, especially spatial interval data (S1904).

The controller controls the signage content to be displayed on each display device with reference to the determined time interval data (S1906).

Figure 20:
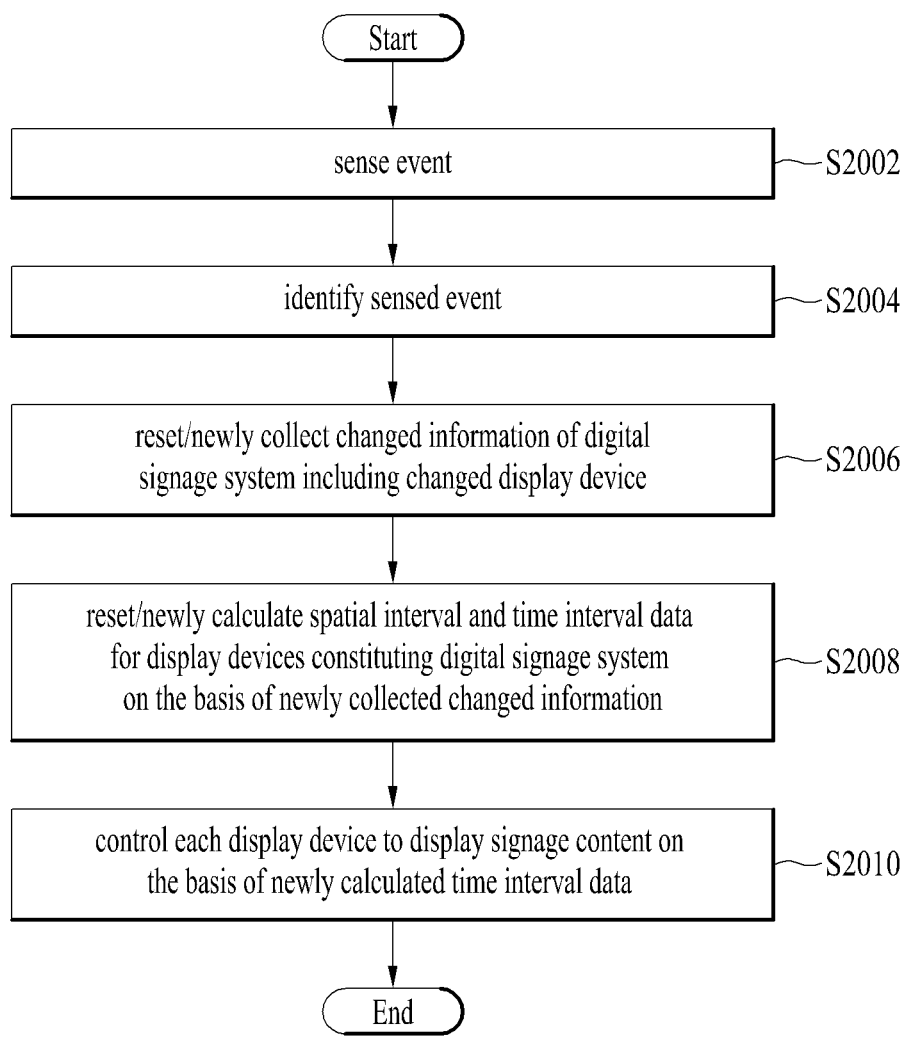
FIG. 20 is a flow chart illustrating a method of processing a predetermined event occurring in a control process of data processing in a digital signage system according to one embodiment of the present invention.

FIG. 20 is a flow chart illustrating a method of processing a predetermined event occurring in a control process of data processing in a digital signage system according to one embodiment of the present invention.

The controller senses an event (S2002), and identifies the sensed event (S2004).

The controller resets information on the change of the digital signage system including the display device having a change in accordance with the identified event and newly collects the information (S2006).

The controller resets spatial interval and time interval data of the display devices constituting the digital signage system on the basis of the newly collected information on the change of the digital signage system and newly calculates the data (S2008).

The controller controls display of the signage content on each display device on the basis of the newly calculated time interval data (S2010).

The digital signage system according to one embodiment of the present invention comprises a plurality of display devices for displaying the signage content, and a server, wherein the server includes a communication unit for transmitting signage content data to each display device, a sensor unit for sensing movement of the plurality of display devices, and a controller for controlling the display devices of which display areas are overlapped, differently from each other on the basis of the sensed movement data of the display devices, if display areas of at least two of the plurality of display devices are overlapped with each other at a predetermined threshold value or more.

In this case, the controller may control the first display device of the plurality of display devices to output the signage content, which is being previously output, as it is and control the second display device to perform a light shielding function. Alternatively, the controller may control the first display device of the plurality of display devices to output at least one object of the signage content, which is being previously output, by fixing an absolute position of an image displayed on the display device regardless of the sensed movement data and differently output the other object on the basis of the sensed movement data, and may control the second display device to perform a light shielding function. The controller may apply split-depth effect to the signage content of the plurality of display devices if the overlapped display areas are the threshold value or more.

Also, the controller may control luminance of the overlapped display areas of each display device to control a luminance difference with the display areas which are not overlapped, within a predetermined range. If the display areas are overlapped at the predetermined threshold value or more, the controller may control luminance of each display device by using the lamp unit. The controller may control at least one of luminance and resolution of each display device before and after the display areas are overlapped at the predetermined threshold value or more, or may control a display time interval between the display devices of which display areas are overlapped at the predetermined threshold value or more, within a preset time.

Meanwhile, at least one of the plurality of display devices may be a one-way mirror including transparent OLED (TOLED) or a mirror including an infinite mirror.

The digital signage system according to another embodiment of the present invention comprises a plurality of display devices (only a first display device of the plurality of display devices may display an image in a first mode) of which display areas are arranged to be overlapped, and a server, wherein the server includes a sensor unit, a communication unit for transmitting image data to at least one of the display devices, and a controller for controlling an image data display time of each display device to allow an image data display time interval of each display device to reach a value less than a predetermined threshold value if the first mode is changed to a second mode as a result of sensing of the sensor unit.

In this case, the first display device may be a one-way mirror including transparent OLED (TOLED), and the other display device except the first display device may be a mirror including an infinite mirror. At least one of the plurality of display devices may be a transparent display device.

Also, the predetermined threshold value of the time interval may be 40 ms or less which is the display time interval between adjacent display devices of the plurality of display devices. The image data may be still image data or moving image data. Also, the controller may control at least one of brightness, resolution and audio volume level of the display devices in the second mode differently from the first mode.

FIG. 21 is a view illustrating an example of a method for implementing a digital signage according to the present invention.

FIG. 21a relates to an embodiment that a single digital signage is implemented, and FIGS. 21b and 21c relate to an embodiment that multi-digital signage is implemented.

Although digital signage described hereinafter may be a display device, the digital signage may mean a device that includes a display device. For example, the digital signage is implemented as one or more display devices. In other words, the digital signage is used for convenience to be identified from the display device in view of display.

For example, a single digital signage 2112 of FIG. 21a is implemented as a store door and displays an image. However, the single digital signage 2112 may be implemented as one or more display devices to display the image.

Meanwhile, FIG. 21b illustrates multi-digital signage of a first state, and FIG. 21c illustrates multi-digital signage of a second state. Each of digital signages 2122 to 2128 constituting the multi-digital signage may display an image. In this case, for convenience, the respective digital signages 2122 to 2128 are continuously arranged to adjoin one another in FIGS. 21b and 21c. However, arrangement of the respective digital signages is not limited to the examples of FIGS. 21b and 21c. Meanwhile, similarly to the aforementioned single digital signage, each digital signage constituting the multi-digital signage of FIGS. 21b and 21c may be implemented as one or more display devices. Also, the first state may mean that the respective digital signages are arranged in parallel as shown in FIG. 21b, and the second state may mean an arrangement state of digital signages different from those of FIG. 21b. In FIG. 21c, the respective digital signages are arranged vertically to one another. Moreover, the respective digital signages constituting the multi-digital signage of FIGS. 21b and 21c may output different signage contents as shown in FIG. 21c or output one signage content as a whole by configuring partial portions of one signage content as shown in FIG. 21b. In case of FIG. 21b, the digital signages may be implemented in such a manner that some digital signages illustrate the first signage content and the other digital signages illustrate the second signage content. This is implemented in various forms by means of various factors such as request and setup of the server or system.

The configuration and relation of the digital signage and the display device will be described as follows.

Figure 22:
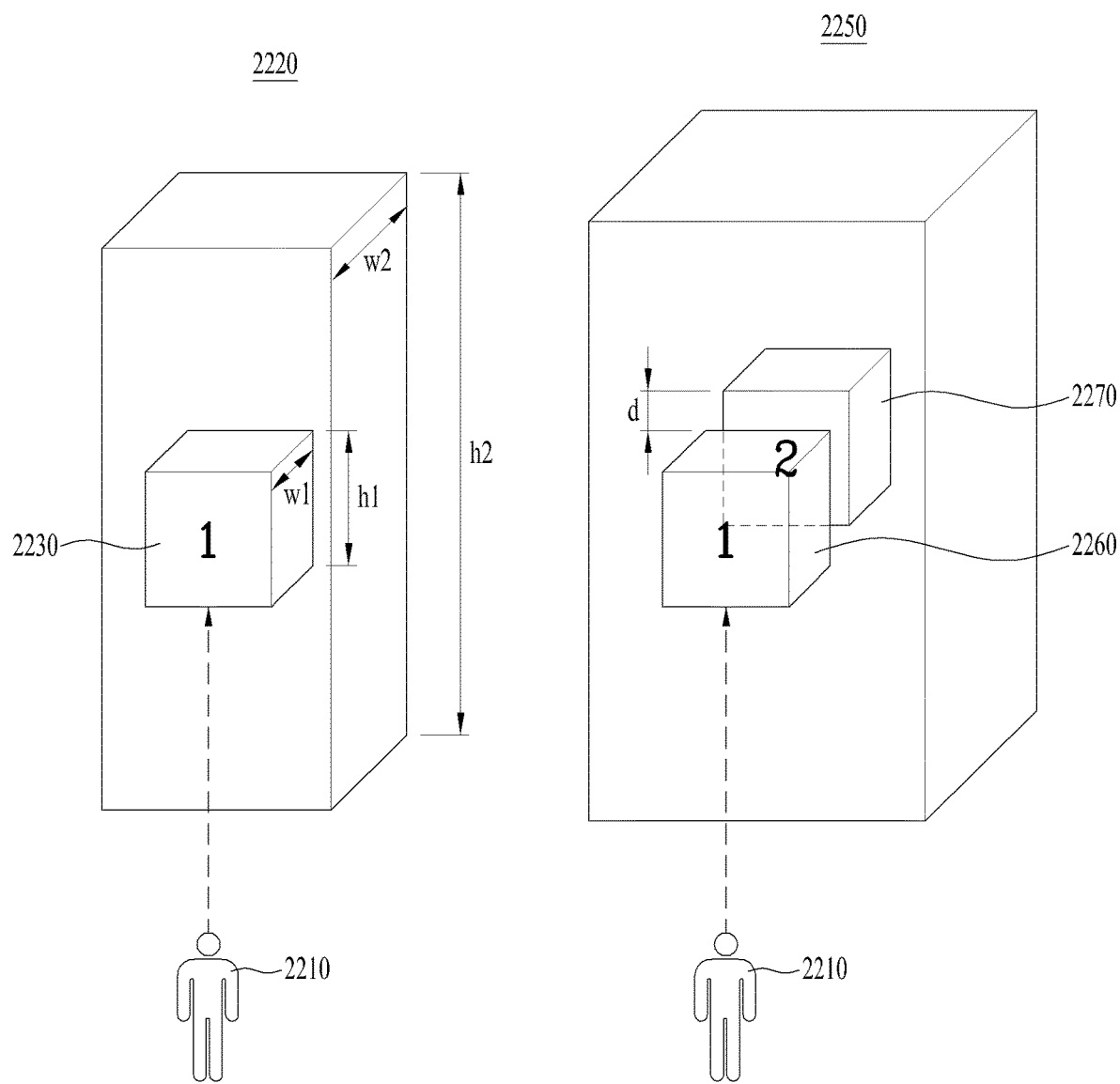
Figure 23:
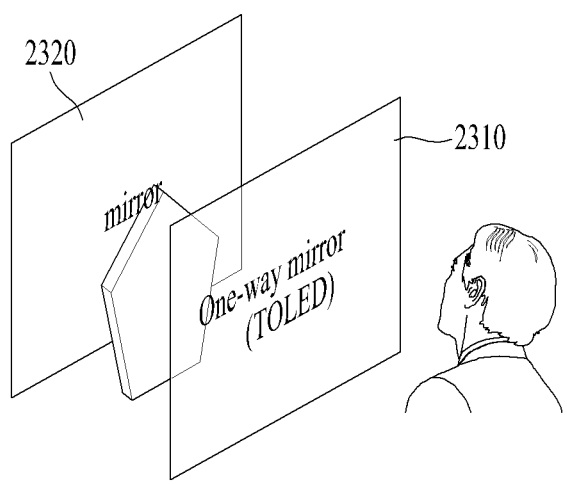

FIGS. 22 to 24 are views illustrating configurations of a digital signage and a display device.

As described above, the digital signage may be implemented as one or more display devices.

FIG. 22a illustrates a digital signage 2220 implemented as only one display device 2230, and FIG. 22b illustrates a digital signage 2250 implemented as two display devices 2260 and 2270.

The digital signages 2220 and 2250 shown in FIGS. 22a and 22b are implemented on a door, an elevator, store, or a wall, and output a signage content.

The digital signage 2220 shown in FIG. 22a has a height h2 and a width w2. Likewise, the digital signage 2250 shown in FIG. 22b may have a height h2 and a width w2. However, this is for convenience of description, and the present invention is not limited to the example of FIG. 22.

The digital signage 2220 of FIG. 22a is implemented as one display device 2230. The display device 2230 may have a height h1 and a width w1, which are the same as the height h2 and the width w2 of the digital signage 2220 or may have values less than the height h2 and the width w2 of the digital signage 2220. Meanwhile, the digital signage 2220 of FIG. 22a may be a transparent display (TOLED).

Next, the digital signage 2250 of FIG. 22b is implemented as the first display device 2260 and the second display device 2270. For convenience of description, based on a reference 2210, a display arranged to be closest to the reference 2210 will be described as the first display device 2260.

Referring to FIG. 22b, the first display device 2260 and the second display device 2270 may be arranged at a predetermined spatial interval or distance d. For convenience, although the first display device 2260 and the second display device 2270 are vertically arranged in series in FIG. 22b, they may have a horizontal arrangement.

Meanwhile, the first display device 2260 and the second display device 2270 of FIG. 22b may display a signage content at a time interval of a predetermined threshold value or less in accordance with or regardless of the spatial interval or distance d, as described above. At this time, if the first display device 2260 and the second display device 2270 output a single signage content, as described above, the user located at the reference 2210 may feel immersion level or stereoscopic effect in accordance with apparent movement of the output signage content. Meanwhile, the predetermined threshold value is set to allow the user located at the reference 2210 to feel the effect of apparent movement for the signage content, and may be 40 m or less, for example. However, the predetermined threshold value may be changed in accordance with the development of technologies. For convenience, although two display devices are shown, if the display device(s) is(are) added, each display device may have the same time interval or not. However, even though the display time interval between the display devices is not maintained equally, the display time interval is preferably the predetermined threshold value or less considering the effect of apparent movement.

Meanwhile, as shown in FIG. 22, in the digital signage implemented as a plurality of display devices, at least one of the plurality of display devices may be a transparent display (TOLED). In this case, the transparent display (TOLED) may be the display device (the first display device 2260 of FIG. 22b) closest to the reference 2210, as described above.

Alternatively, in the digital signage implemented as a plurality of display devices, at least one of the plurality of display devices may be a mirror.

For example, the digital signage 2300 implemented as two display devices 2310 and 2320 is shown in FIG. 23. In this case, the first mirror 2310 closest to the reference may be a one-way mirror. The one-way mirror includes a transparent display (TOLED).

In addition, a combination of the one-way mirror 2310 and the mirror 2320 or the digital signage 2300 implemented by the combination may be referred to as an infinite mirror. At this time, an object may be arranged between the one-way mirror 2310 and the mirror 2320. The object may include a light emitting diode such as LED as shown in FIGS. 24a to 24c. In other words, FIGS. 24a to 24c illustrate various infinite mirrors or digital signage implemented by combination of the various infinite mirrors.

Meanwhile, size, shape, etc. of the digital signage and the display device shown in the drawings and disclosed in this specification are intended to assist understanding of the present invention and intended for convenience of description, and are not limited to the present invention and may be different from actual size, shape, etc.

FIG. 25 is a view illustrating a digital signage implemented in accordance with one embodiment of the present invention.

Referring to FIG. 25, an example of the digital signage system according to the present invention comprise one or more display devices and a server.

In FIG. 25a, a digital signage 2510 is installed on a store door. For convenience of description, doors of a store are implemented to be opened and closed in FIG. 25a, and it is assumed that the digital signage 2510 is implemented on a single door of the store doors. However, the present invention is not limited to the example of FIG. 25.

For example, the display device constituting the digital signage 2510 may be any one of FIGS. 22a and 22b. For example, if the digital signage 2510 is implemented as one display device as shown in FIG. 22a, the display device may be a transparent display (TOLED). In this case, as shown in FIG. 25, the display device may detachably be implemented on the store door.

Meanwhile, although not shown in FIG. 25, the server controls the output of the signage content through one or more display devices constituting the digital signage by wholly managing the digital signage system.

Particularly, FIG. 25 relates to an embodiment that the signage content of the digital signage is controlled based on data sensed through the sensor.

In this case, the sensor means a combination of one or more of a motion sensor, an acceleration sensor, a gyro sensor, a temperature sensor, and a camera sensor.

Particularly, FIG. 25 relates to a control of the output of the signage content through the digital signage in accordance with recognition of a user who approaches to the store doors in which the digital signage is installed or movement of the door such as opening or closing of the store door of the recognized user. In this case, movement such as opening or closing of the store door is not limited to the door in which the digital signage is installed. For convenience of description, if a door in which the digital signage is not installed is opened FIG. 25 illustrates a control of the digital signage implemented on another door.

FIG. 25b illustrates the digital signage 2510 implemented on the store door.

FIGS. 25c and 25d illustrate that a user located near the store door is recognized. In this case, as shown, the digital signages 2520 and 2530 provide a signage content different from that of FIG. 25b.

According to the present invention, if an event is sensed based on the data sensed from the sensor, the digital signage may perform an operation different from that performed before the event is sensed. For example, the digital signage 2510 on the store door may provide a still image to the signage content if there is no event as shown in FIG. 25b, and may provide a moving image to the signage content as shown in FIGS. 25c and 25d if the event is sensed. At this time, the still image and the moving image may be signage contents different from each other, or may be the same content but have output types different from each other. If one or more display devices constituting the digital signage are all transparent displays, the display devices serve as a glass without displaying or outputting any data if there is no event, and may provide the signage content and thus may be opaque. In this respect, the signage content on the digital signage may be implemented in various forms.

FIG. 26 is a view illustrating a digital signage implemented in a store sliding door according to one embodiment of the present invention.

Referring to FIG. 26a, digital signages 2615 and 2625 are provided in each of store sliding doors 2610 and 2620.

At this time, each of the digital signages 2615 and 2625 may be implemented as one or more display devices as shown in FIG. 22a or 22b. Also, each display device may be a transparent display (TOLED)

As shown in FIG. 26a, the controller within the server of the digital signage system may output a signage content as each or all of the digital signages 2615 and 2625 provided on the store sliding doors 2610 and 2620. In the case that the controller outputs a signage content as each of the digital signages 2615 and 2625 provided on the store sliding doors 2615 and 2625, the digital signage of each sliding door outputs an individual signage content. In the case that the controller outputs a signage content as all of the digital signages 2615 and 2625 provided on the store sliding doors 2615 and 2625, as shown, the first digital signage 2615 provided on the first store door 2610 may output a part of the single signage content, and the second digital signage 2625 provided on the second store door 2620 may output the other of the single signage content. In this way, if one signage content is output through the digital signages provided on the store doors, a large-scaled screen may be configured.

Each display device constituting the digital signage system disclosed in this specification may receive a touch input, and may output a signage content, a response message, etc. corresponding to the received touch input under the control of the controller of the server.

If FIG. 26a illustrates that the store doors configure a large-scaled screen in a first state, that is, a door closed state, FIG. 26b may illustrate that the store doors configure a second state, that is, a door open state. The horizontally arranged store doors are opened or closed in a vertical direction in FIG. 25, whereas the horizontally arranged store doors are opened or closed in a horizontal direction in FIG. 26b. The store doors operated like the latter case will be referred to as store sliding doors.

Referring to FIG. 26b, at least one constituting the store sliding doors may be slid in a horizontal direction or a left and right directions on the drawing. In this case, some or all of areas of each store sliding door may be overlapped through sliding. As a result, the digital signage implemented on the store sliding door may be overlapped equally.

As shown in FIGS. 26a and 26b, output resolution of the digital signage, audio volume level of the digital signage, and attribute and type of signage content provided in the digital signage may be changed variously depending on the first state or the second state of the store sliding doors. This will be described later in more detail.

FIGS. 27 to 31 are views illustrating a method for providing a signage content in store sliding doors in accordance with one embodiment of the present invention.

If store doors sliding is sensed as shown in FIG. 27a regardless of the fact that a single signage content is output or not from the store sliding doors as a large-scaled screen, the controller of the server may control the signage content to be displayed in a split-depth scheme as shown in FIG. 27b.

The split-depth scheme is to enhance a stereoscopic effect of 2-dimensional (2D) image by adding a line having the same color as that of a background to the image. Since the split-depth scheme is already known in the art, its detailed description will be omitted.

Referring to FIG. 27a, the controller of the server senses store doors sliding, wherein this sensing may be performed if digital signage areas of the respective store doors are overlapped at a predetermined threshold value or less (2710). At this time, the threshold value may be set randomly. For example, the threshold value may be set to the case that the overlapped area due to the store doors sliding is a half or more of the digital signage area.

In FIG. 28a, the digital signage of each store door outputs a signage content as described above.

In this case, as shown in FIG. 28b, if the store doors sliding is performed, the signage content provided through the second digital signage, which is actually slid, instead of the first digital signage which is fixed, may be changed and provided to be suitable for the sliding direction and speed unlike FIG. 27.

This is intended to allow a user to feel that image is arranged on a real space without being formed during sliding by fixing a position of the image displayed on the display device to an absolute position of a real world and expressing the image to disappear when the signage content moves. As described above, a sliding speed of the sliding door is sensed to move the image to an opposite direction of the sliding direction, whereby signage effect may be maximized.

If a first object 2832 and a second object 2834 exist on the second digital signage of FIG. 28a and store doors are slid at a first speed in a first direction, at least one of the objects may be modified to be matched with the direction and speed as shown in FIG. 28b. For example, it is assumed that the first object 2832 is a star and the second object 2834 is a car in FIG. 28. In this case, if the car moves at the above speed in the above direction in accordance with sliding, a relative position of the second object 2834 on the digital signage is maintained in accordance with the position of the store door which is slid, whereas a relative position of the first object 2832 on the digital signage is changed in accordance with sliding. In other words, it seems that the first object 2832 which is a fixed object moves to an opposite direction of the sliding direction in accordance with sliding, and the second object which is a moving object moves to the sliding direction in accordance with sliding.

Figure 30:
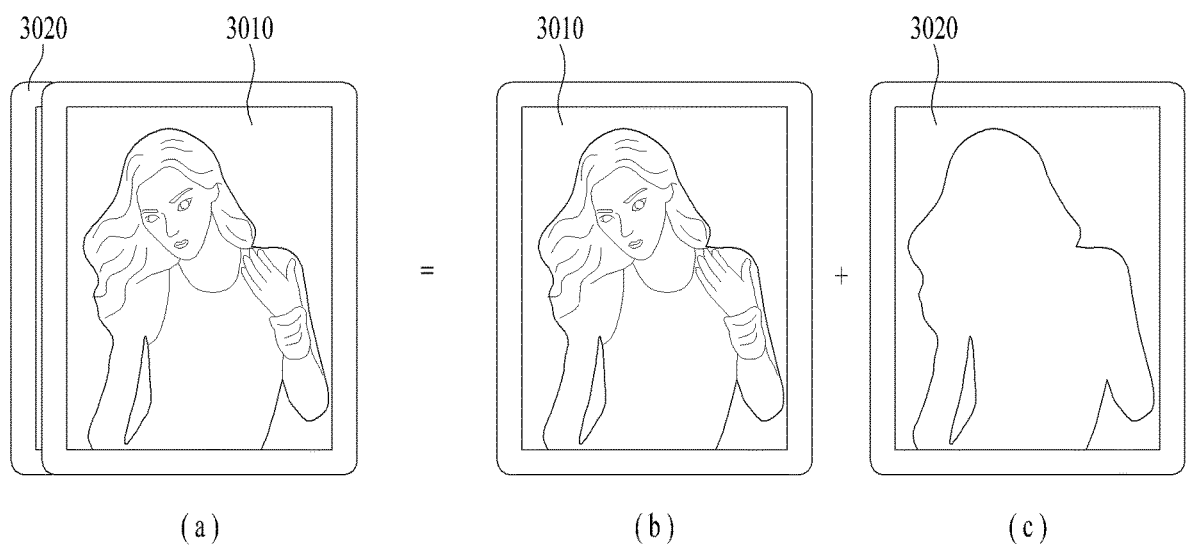

FIG. 29 illustrates image overlap when the display devices constituting the digital signages of the store sliding doors are all transparent displays (TOLED), and FIG. 30 illustrates a method for minimizing the image overlap of FIG. 29.

FIG. 29a illustrates image overlap on the transparent display devices, and FIG. 29b illustrates image overlap between images on the transparent display devices and a real object.

First of all, referring to FIG. 29, if a signage content is provided on a transparent display having no light shielding plate, a back space is not shielded fully.

If a signage content such as a person in addition to a signage content indicating material such as water or fire is provided and overlapped through each transparent display, quality of each signage content may be degraded. For this reason, if the transparent display is applied to the digital signage, a separate light shielding plate may be used. However, in this case, a problem may occur in that cost increase may be caused by additional hardware configuration and an advantage of the transparent display may be reduced in accordance with application of the light shielding plate.

Referring to a side view of FIG. 29a, it is noted that each transparent display provides a signage content including objects. However, in case of a front view not the side view, it is noted that positions of objects are overlapped, whereby it may be difficult to recognize corresponding content or objects depending on the signage content.

Referring to a side view of FIG. 29b, a single object is provided on one transparent display, and a real object is overlapped with an area for providing the transparent display on a rear surface of the transparent display. At this time, it is noted from a front view that an object provided on the transparent display is overlapped with the real object depending on the position or view of the real object due to the transparent display, whereby it may be difficult to recognize the object on the transparent display.

In this respect, in FIG. 30, the second transparent display arranged relatively behind the reference in accordance with sliding is used as a light shielding plate, whereby the problem of FIG. 29 may be solved.

As shown in FIG. 30a, if the first transparent display 3010 and the second transparent display 3020 are overlapped at a threshold value or more, the first transparent display 3010 outputs a signage content as it is as shown in FIG. 30b, and the second transparent display 3020 may be modified to a light shielding plate as shown in FIG. 30c.

Alternatively, in FIG. 30c, the second transparent display 3020 may serve as a role similar to the light shielding plate by providing display-off or a specific color such as white and black as a background. At this time, the specific color provided as a background may be determined depending on the signage content on the first transparent display 3010, for example.

Meanwhile, in FIG. 30b, the first transparent display 3010 may provide resolution, brightness, etc. differently from those prior to sliding. Particularly, brightness may be controlled through an emitting device located on or in the periphery of the transparent display as shown in FIG. 9.

Figure 31:
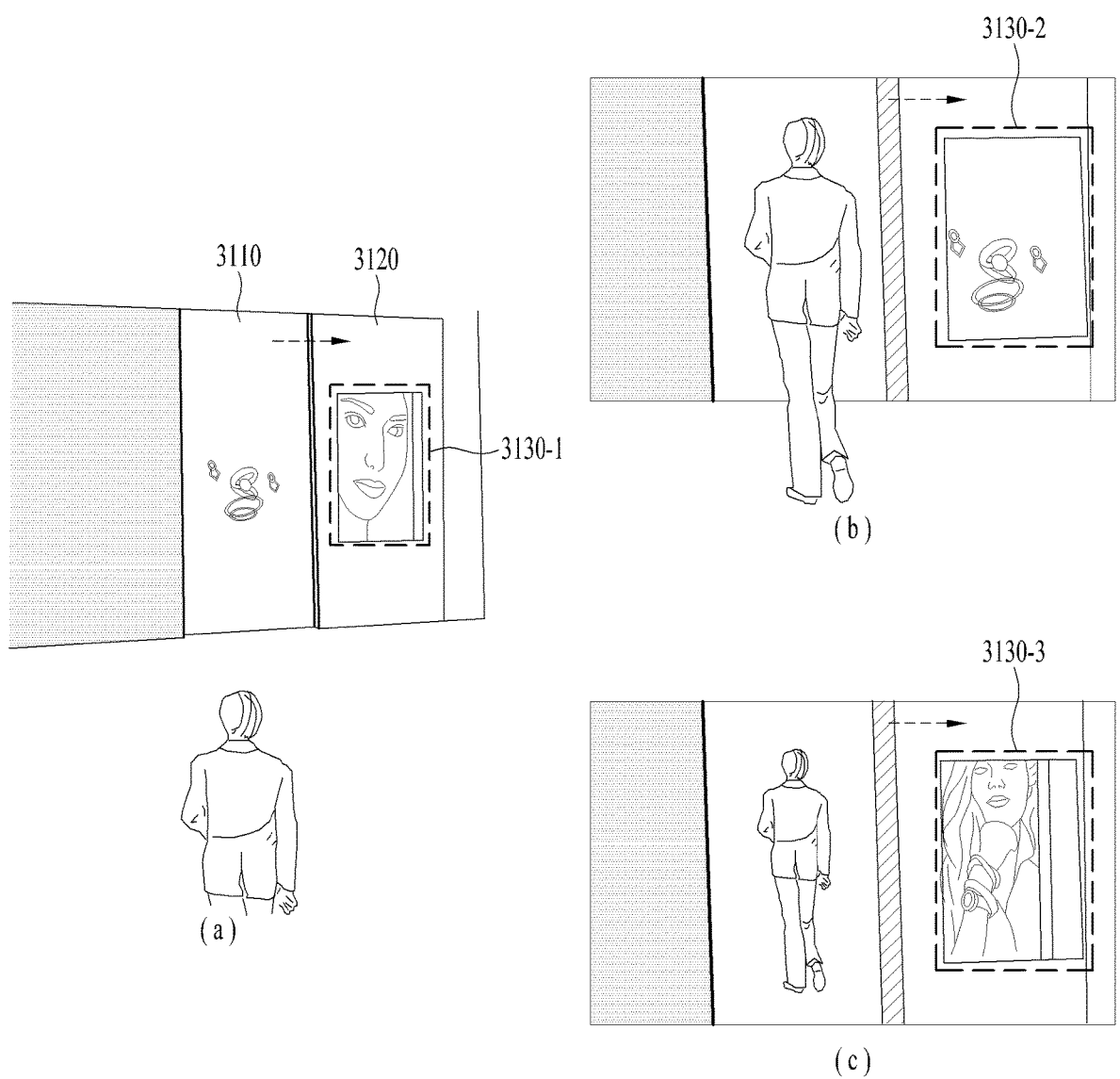

FIG. 31 illustrates an example of a digital signage control scenario according to sliding in accordance with the aforementioned embodiment of the present invention.

Referring to FIG. 31a, a first store door 3110 and a second store door 3120 are closed without overlap. At this time, digital signage is implemented on each store door using at least one or more transparent displays. However, referring to FIG. 31a, a signage content on the first store door 3110 is not provided from the transparent display and is controlled to allow the inside of the store to be seen, whereas a signage content 3130-1 is provided on the second store door 3120 from the transparent display. At this time, it is assumed that the second store door 3120 is fixed during sliding and the first store door 3110 moves to overlap the first store door 3110 and the second store door 3120.

Referring to FIG. 31b, if a user approaches to the store to enter the store, the controller controls movement of the first store door 3110 to overlap the first store door 3110 with the second store door 3120. Therefore, the user may enter the store in accordance with movement of the first store door 3110.

In this way, if the store doors are overlapped in accordance with sliding, the first transparent display and the second transparent display are overlapped when supposing a front view. Therefore, in this case, the overlapped transparent displays may be controlled to provide a single signage content at a predetermined display time interval in accordance with the aforementioned scheme. Therefore, the signage content 3130-2 provided in FIG. 31b may be different from the signage content 3130-1 provided by the second transparent display in FIG. 31a.

Meanwhile, in FIG. 31c, it is noted that the signage content 3130-2 is continuously provided subsequently to FIG. 31b if sliding does not end. In FIG. 31c, it is noted that even though the user has entered the store in FIG. 31b, if a new user or movement is sensed within a predetermined time, sliding is maintained continuously to provide a signage content.

In FIG. 31b or 31c, if sliding ends and thus each store door returns to FIG. 31a, the signage content 3130 may be provided again as shown in FIG. 31a.

Figure 32:
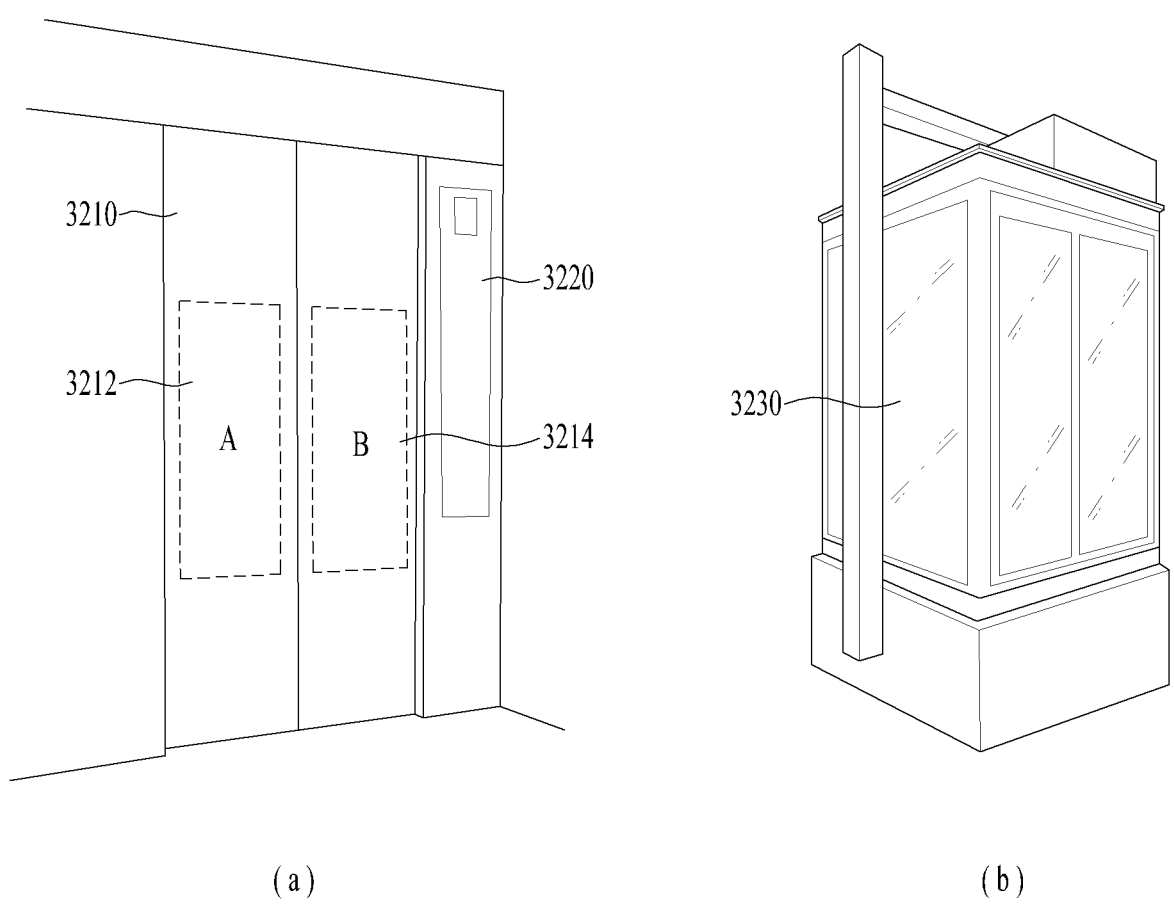
FIG. 32 is a view illustrating a digital signage system implemented in an elevator in accordance with one embodiment of the present invention.

FIG. 32 is a view illustrating a digital signage system implemented in an elevator in accordance with one embodiment of the present invention.

FIG. 32a illustrates a digital signage provided outdoor including an elevator door 3210, and FIG. 32b illustrates a digital signage provided inside an elevator.

Referring to FIG. 32a, digital signages 3212 and 3214 are provided on elevator doors, wherein the respective digital signages may provide different signage contents A and B or a single signage content as a large-scaled screen.

The server provides a signage content of the digital signages 3212 and 3214 provided on the elevator door 3210 if an event such as movement near the elevator door 3210 and an input for a floor selector 3220 is sensed.

At this time, the server may provide information related to weather, advertisement and stock as well as information on position, passengers and an estimated arrival time of an elevator for a digital signage implemented as a transparent display. Meanwhile, if a corresponding elevator is arrived in FIG. 32a, the server may end provision of the signage content and control the elevator to allow the inside of the elevator to be seen transparently.

Meanwhile, referring to FIG. 32b, a digital signage based on a transparent display may be provided on at least one surface 3230 of internal surfaces of the elevator generally implemented as a rectangular shape. At this time, the transparent display may be a touch screen type that is able to receive a touch input.

The server provides a signage content through the transparent display on the basis of various kinds of information such as a current position of an elevator, an input related to the elevator, passengers of the elevator, the passengers' gender, and the passengers' age if the presence of at least one passenger is sensed. However, there is no passenger in the elevator, the server may control the elevator to allow an external appearance of the elevator to be seen through display-off.

FIG. 33 is a view illustrating a digital signage system implemented in a revolving door in accordance with one embodiment of the present invention.

FIG. 33a is a structural view illustrating appearance when a revolving door is viewed from above. In FIG. 33a, a digital signage 310 implemented as a transparent display is provided on at least one revolving door within a revolving cover 3320.

FIG. 33b illustrates a front view of a revolving door. For convenience of description, two revolving doors are configured unlike FIG. 33a and rotated along the revolving cover 3320. Each revolving door is provided with digital signages 3310 and 3330 including a transparent display.

If a user is sensed near the revolving door through a sensor 3340, the revolving door is rotated to allow the user to assist entrance to the revolving door. At this time, each of the digital signages 3310 and 3330 on the revolving door provides a signage content in accordance with entrance of the user.

Alternatively, each of the digital signages 3310 and 3330 on the revolving door provides a signage content but may provide a new signage content on an area 3350 where digital signage areas on the revolving cover 3320 and the revolving door are overlapped based on the reference. Or, each of the digital signages 3310 and 3330 may provide the signage content from the time when digital signage areas on the revolving cover 3320 and the revolving door are overlapped.

The revolving door stops its rotation after the user passes through the revolving door, and is displayed transparently, wherein the revolving door may assist preparation for next digital signage by reporting to the server the fact that the user has passed through the revolving door. At this time, the reported message may include information on the signage content viewed by the user inside the revolving door and information on an input and feedback of the user for the signage content as well as the fact that the user has passed through the revolving door.

The server may control another digital signage or the signage content, which will be provided by the digital signage, on the basis of the report data of the revolving door.

Figure 34:
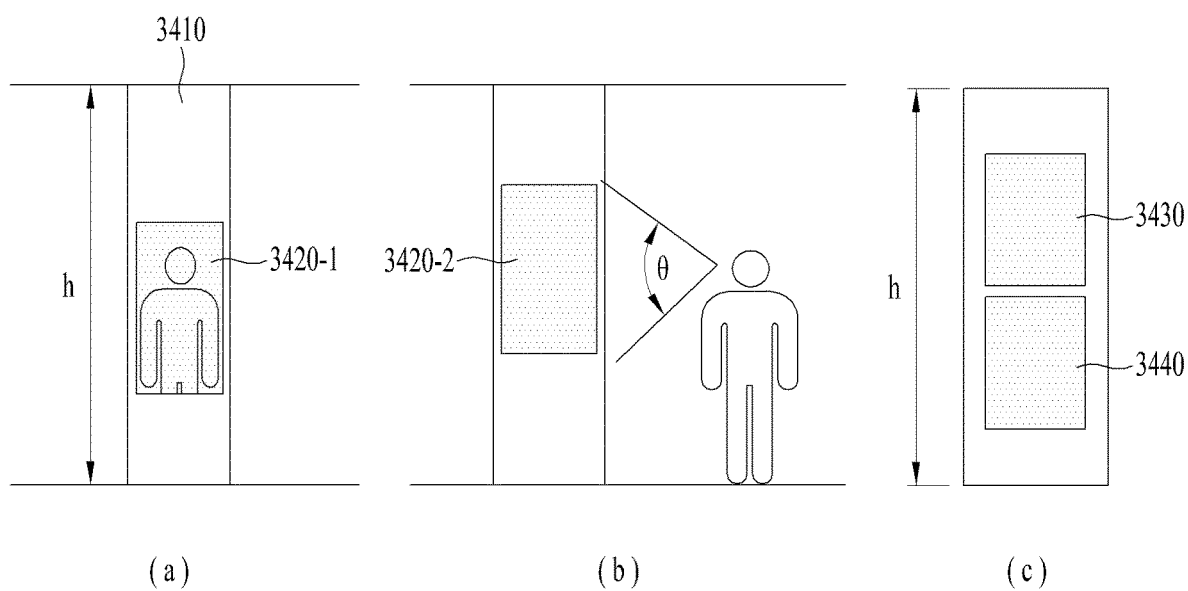
FIG. 34 is a view illustrating a moving display device in a digital signage in accordance with one embodiment of the present invention.

FIG. 34 is a view illustrating a moving display device in a digital signage in accordance with one embodiment of the present invention.

In FIGS. 34a and 34b, the display device is applied to a part of the digital signage except that the display device is a digital signage, and is not fixed but movable within the digital signage.

Referring to FIG. 34a, it is noted that the display device is arranged on a first area 3420-1 within the digital signage 3410. When the digital signage is implemented to have a predetermined height and a predetermined width, it may be difficult for a user to view a signage content of the display device arranged on the first area 3420-1 depending on the user who views the signage content.

Therefore, in FIG. 34b, the server may control the display device to change its position within the digital signage 3410.

As shown, a viewing angle of a user is generally 80°. Therefore, the server may control the display device to provide a signage content by changing its position within the digital signage to a second area 3420-2 not the first position 3420-1 on the basis of height data of the sensed user, whereby the above viewing angle may be obtained. This is equally applied to a plurality of users. For example, if a plurality of users are sensed by the digital signage, the position of the display device within the digital signage may be determined based on the position previously set depending on the number of users or a viewing angle of the tallest user because there may be a difference in height among the users. However, the present invention is not limited to this example.

In FIG. 34b, a plurality of display devices are provided without overlap in one digital signage.

In this case, under the aforementioned status, the first display device 3430 may only be turned on or the second display device 3440 may only be turned on. In this way, on/off control or size change of the display device within the digital signage may be performed variously depending on the event.

The disclosure in FIG. 34 may be applied to all of the aforementioned embodiments.

Figure 35:
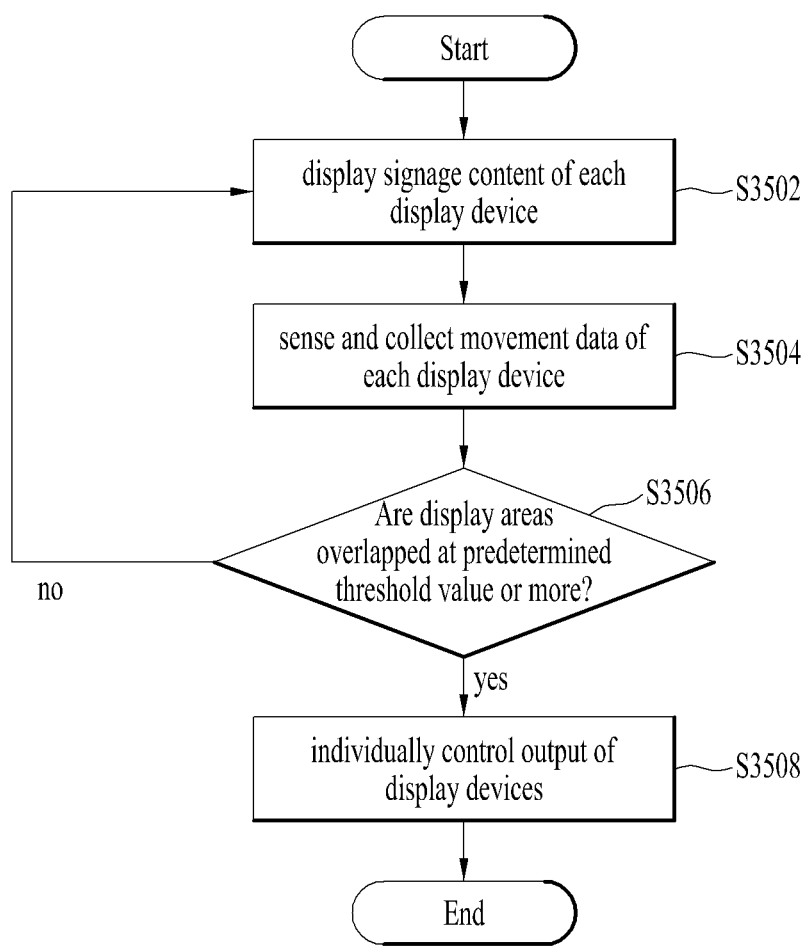
FIG. 35 is a flow chart illustrating a method for controlling display devices in a digital signage system according to one embodiment of the present invention.
Figure 36:
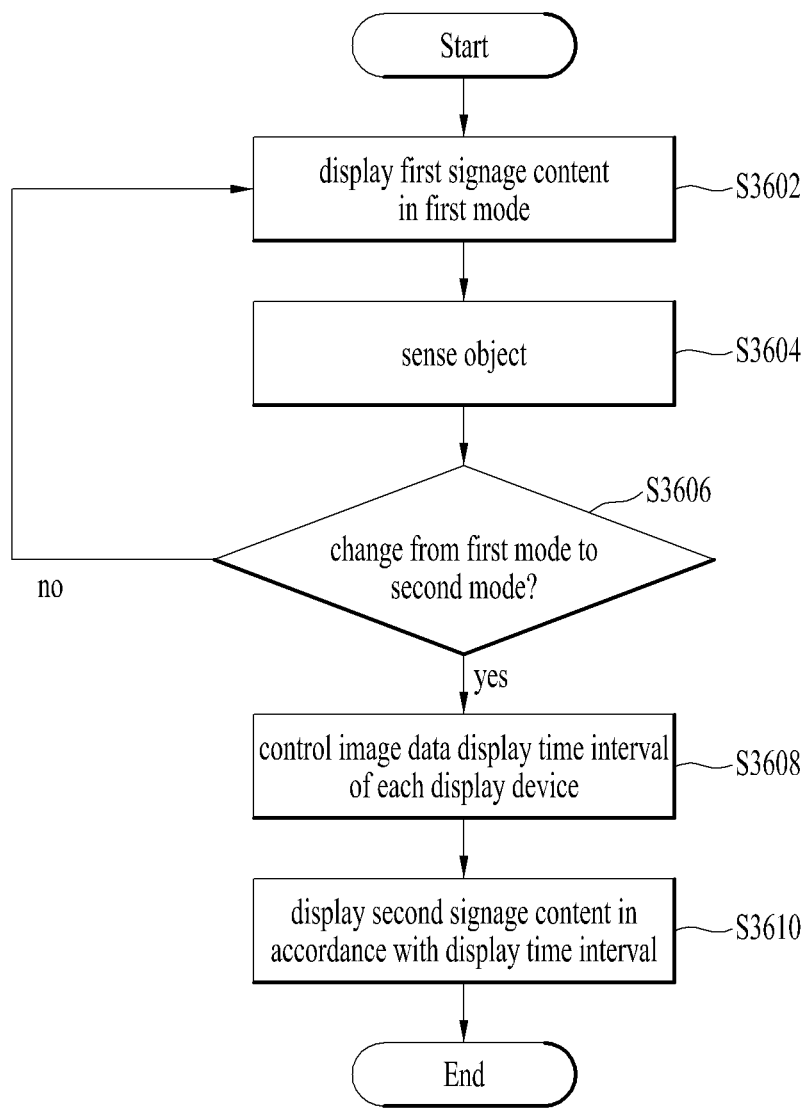
FIG. 36 is a flow chart illustrating a method for controlling display devices in a digital signage system according to another embodiment of the present invention.

FIG. 35 is a flow chart illustrating a method for controlling display devices in a digital signage system according to one embodiment of the present invention, and FIG. 36 is a flow chart illustrating a method for controlling display devices in a digital signage system according to another embodiment of the present invention.

First of all, referring to FIG. 35, the controller controls each display device to display a signage content (S3502). At this time, the controller continues to sense and collect movement data of each display device (S3504).

The controller determines whether display areas of the display devices are overlapped at a predetermined threshold value or more, on the basis of the collected movement data of the display devices.

As a result of the step S3506, if the display areas of the display devices are overlapped at the predetermined threshold value or more, the controller individually controls signage content output of the display devices (S3508). At this time, the embodiment of the individual control will be understood with reference to the aforementioned embodiment(s) and will be omitted herein. For example, the controller controls the first display device to output the signage content, which is being previously output, as it is, and controls the second display device to perform a light shielding function. The controller may apply a split-depth effect to signage content output between the display devices in accordance with the overlap level.

Next, referring to FIG. 36, the controller controls the first display device constituting the digital signage to display a first signage content in a first mode (S3602). At this time, the controller senses an object by sensing the periphery of the digital signage (S3604).

The controller determines whether the first mode of the digital signage is changed to the second mode, on the basis of the sensed object (S3606).

As a result of the step S3606, if the first mode is changed to the second mode, the controller controls a display time interval of the signage content including image data of each display device constituting the digital signage (S3608).

The controller controls the digital signage to display a second signage content in accordance with the display time interval (S3610).

According to at least one of the aforementioned embodiments of the present invention, the digital signage system that provides a stereoscopic signage content having depth and the immersion level may be provided unlike the related art digital signage system that only provides two-dimensional signage information. The digital signage system according to the present invention may actively control the digital signage by controlling the signage content in response to various events such as movement of the display devices, and may be implemented as above to maximize the effect of the digital signage.

The features, structures, effects, etc. described in the aforementioned embodiments are included in, but not limited to, at least one embodiment of the present invention. Moreover, the features, structures, effects, etc. described in the embodiments can be carried out by those skilled in the art to which the embodiments pertain through combination or modification. Therefore, the descriptions related to the combination and modification should be construed to be included in the scope of the present invention.

Also, although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. The scope of the invention should be determined by reasonable interpretation of the appended claims and all change which comes within the equivalent scope of the invention are included in the scope of the invention.

What is claimed is:

1. A digital display system comprising:
a plurality of display devices of which display areas are arranged to be overlapped, in a first mode, only a first display device of the plurality of display devices is configured to display an image from a server, wherein each of the plurality of display devices is spaced apart from one another and is parallel to one another;
a sensor unit configured to sense movement of the plurality of display devices; and
a controller configured to:
control each of the plurality of display devices to be spaced apart by a predetermined distance, and
control an image data display time of each display device among the plurality of display devices to allow an image data display time interval of each display device to reach a value less than a predetermined threshold value if the first mode is changed to a second mode as a result of sensing of the sensor unit,
wherein in the second mode, the controller controls at least one of brightness, resolution and audio volume level of the display devices differently from the first mode.

2. The digital display system according to claim 1, wherein the first display device is a one-way mirror including a transparent OLED (TOLED), and the other display devices except for the first display device are a mirror including an infinite mirror.

3. The digital display system according to claim 1, wherein at least one of the plurality of display devices is a transparent display device.

4. The digital display system according to claim 1, wherein the predetermined threshold value of the time interval is 40 ms or less, corresponding to the display time interval between adjacent display devices of the plurality of display devices.

5. The digital display system according to claim 1, wherein the image data are still image data or moving image data.

* * * * *